(12) United States Patent
Liu et al.

(10) Patent No.: US 10,404,979 B2
(45) Date of Patent: Sep. 3, 2019

(54) VIDEO CODING WITH INTERPOLATED REFERENCE PICTURES

(71) Applicant: MEDIATEK INC., Hsinchu (TW)

(72) Inventors: Shan Liu, San Jose, CA (US); Xiaozhong Xu, State College, PA (US)

(73) Assignee: MEDIATEK INC., Hsinchu (TW)

( * ) Notice: Subject to any disclaimer, the term of this patent is extended or adjusted under 35 U.S.C. 154(b) by 51 days.

(21) Appl. No.: 15/460,835

(22) Filed: Mar. 16, 2017

(65) Prior Publication Data

US 2017/0272744 A1 Sep. 21, 2017

Related U.S. Application Data

(60) Provisional application No. 62/309,485, filed on Mar. 17, 2016.

(51) Int. Cl.
| | |
|---|---|
| H04N 19/105 | (2014.01) |
| H04N 19/51 | (2014.01) |
| H04N 19/70 | (2014.01) |
| H04N 19/15 | (2014.01) |
| H04N 19/573 | (2014.01) |
| H04N 19/577 | (2014.01) |
| H04N 19/172 | (2014.01) |
| H04N 19/176 | (2014.01) |
| H04N 19/184 | (2014.01) |

(52) U.S. Cl.
CPC ........... *H04N 19/105* (2014.11); *H04N 19/15* (2014.11); *H04N 19/51* (2014.11); *H04N 19/573* (2014.11); *H04N 19/577* (2014.11); *H04N 19/70* (2014.11); *H04N 19/172* (2014.11); *H04N 19/176* (2014.11); *H04N 19/184* (2014.11)

(58) Field of Classification Search
None
See application file for complete search history.

(56) References Cited

U.S. PATENT DOCUMENTS

| | | | |
|---|---|---|---|
| 2005/0058206 A1* | 3/2005 | Lim | H04N 21/23406 375/240.25 |
| 2010/0002770 A1* | 1/2010 | Motta | H04N 19/147 375/240.16 |
| 2013/0077687 A1* | 3/2013 | Wang | H04N 19/105 375/240.15 |
| 2013/0235927 A1* | 9/2013 | Win | H04N 19/43 375/240.02 |
| 2015/0172715 A1* | 6/2015 | Shimizu | H04N 19/597 375/240.16 |

* cited by examiner

*Primary Examiner* — Frederick D Bailey
(74) *Attorney, Agent, or Firm* — Oblon, McClelland, Maier & Neustadt, L.L.P.

(57) ABSTRACT

Aspects of the disclosure provide an apparatus for encoding a sequence of pictures into a coded bit stream. The apparatus can include a decoded picture buffer (DPB) configured to store reference pictures, at least one of the reference pictures being an interpolated reference picture (IRP), an interpolation circuit configured to generate the IRP based on the reference pictures stored in the DPB, an encoding circuit configured to encode a current picture in the sequence of pictures based on a value of a variable indicating whether the current picture is to be encoded using the IRP, and an encoding controller configured to determine the value of the variable according to a size of DPB and the reference pictures stored in the DPB.

30 Claims, 9 Drawing Sheets

VIDEO CODING WITH INTERPOLATED REFERENCE PICTURES

INCORPORATION BY REFERENCE

This present disclosure claims the benefit of U.S. Provisional Application No. 62/309,485, "Methods and Apparatus for Reference Picture Generation and Management in Video Compression" filed on Mar. 17, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a video compression process, one or more reference pictures stored in a reference picture buffer can be employed to form a predicted picture of a picture that is currently being encoded (a current picture). Typically, the reference pictures used to encode the current picture are previously encoded pictures of a picture sequence. Subsequently, differences between the current picture and the predicted picture can be processed and transmitted to a decoder, as opposed to transmitting the current picture. By using this technique, a bit rate for transmission of video data can be reduced.

SUMMARY

Aspects of the disclosure provide an apparatus for encoding a sequence of pictures into a coded bit stream. The apparatus can include a decoded picture buffer (DPB) configured to store reference pictures, at least one of the reference pictures being an interpolated reference picture (IRP), an interpolation circuit configured to generate the IRP based on the reference pictures stored in the DPB, an encoding circuit configured to encode a current picture in the sequence of pictures based on a value of a variable indicating whether the current picture is to be encoded using the IRP, and an encoding controller configured to determine the value of the variable according to a size of DPB and the reference pictures stored in the DPB.

In an embodiment, the encoding controller is further configured to determine a set of interpolation parameters for generation of the IRP, and determine an arrangement of a reference picture list that includes the IRP.

In one embodiment, the interpolation circuit is further configured to perform at least one of the following operations based on the set of interpolation parameters to generate the IRP: calculating a weighted picture average based on a past reference picture and a future reference picture with respect to the current picture, calculating a weighted picture average of two past reference pictures or two future reference pictures with respect to the current picture, performing a motion compensated interpolation of a past reference picture and a future reference picture with respect to the current picture, or performing a motion compensated interpolation of two past reference pictures or two future pictures with respect to the current picture.

In one embodiment, the encoding circuit is further configured to construct the reference picture list according to the arrangement of the reference picture list based on the reference pictures stored in the DPB. In one example, the arrangement of the reference picture list includes arranging the IRP in a last position of the reference picture list, a default position of the reference picture list, a specific position of the reference picture list specified in a high-level syntax element, or a position between short-term and long-term reference pictures in the reference picture list. In another example, a current reference picture, which includes decoded blocks of the currently being decoded picture, is used as a reference picture for encoding the current picture, and is included in the reference picture list. Accordingly, the IRP can be arranged in the reference picture list in one of the following positions: a second to last position while the current reference picture is in a last position of the reference picture list, the last position while the current reference picture is in the second to last position of the reference picture list, a position between short-term and long-term reference pictures and before the current reference picture which is arranged between the short-term and long-term reference pictures, or a position between short-term and long-term reference pictures and after the current reference picture which is arranged between the short-term and long-term reference pictures.

In one example, the encoding controller is further configured to generate a syntax element associated with the set of interpolation parameters for generation of the IRP to be incorporated in the coded bit stream, and/or generate a syntax element associated with the arrangement of a reference picture list that includes the IRP to be incorporated in the coded bit stream.

In one example, the value of the variable is associated with one or more of: a number of reference pictures stored in the DPB, whether the DPB is full, an existence of two different reference pictures in the DPB, and whether Intra block copy (IBC) is used. In one example, the encoding controller is further configured to generate a syntax element associated with the value of the variable to be incorporated in the coded bit stream.

In one example, a buffer space is allocated for storing the IRP before the coding circuit encodes the current picture, and the IRP is removed from the DPB after the coding circuit encodes the current picture by using the IRP. In an alternative example, a buffer space is allocated for storing the IRP before the coding circuit encodes the current picture, and the IRP is remained in the DPB for a future picture after the coding circuit encodes the current picture by using the IRP.

Aspects of the disclosure provide an apparatus for decoding a sequence of pictures from a coded bit stream. The apparatus can include a decoded picture buffer (DPB) configured to store reference pictures, at least one of the reference pictures being an interpolated reference picture (IRP), an interpolation circuit configured to generate the IRP based on the reference pictures stored in the DPB, a decoding circuit configured to decode a current picture in the sequence of pictures based on a value of a variable indicating whether the current picture is to be decoded using the IRP, and a decoding controller configured to determine the value of the variable according to a size of the DPB and the reference pictures stored in the DPB.

Aspects of the disclosure provide a method for encoding a sequence of pictures into a coded bit stream. The method can include determining a value of a variable according to a size of a decoded picture buffer (DPB) and reference pictures stored in the DPB, the value of the variable indicating whether a current picture in the sequence of pictures is to be encoded using an interpolated reference picture (IRP); when the value of the variable indicates the current picture in the sequence of pictures is encoded using the IRP, encoding the current picture by using the IRP generated based on reference pictures stored in the DPB.

Aspects of the disclosure provide a method for decoding a sequence of pictures from a coded bit stream. The method can include determining a value of a variable according to a size of a decoded picture buffer (DPB) and reference pictures stored in the DPB, the value of the variable indicating that a current picture in the sequence of pictures is to be decoded using an interpolated reference picture (IRP); when the value of the variable indicates the current picture in the sequence of pictures is to be decoded using the IRP, decoding the current picture by using the IRP generated based on reference pictures stored in the DPB.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Conventional video coding systems can employ reference pictures to perform the encoding or decoding process. An encoder can store a set of pictures in a decoded picture buffer (DPB) and use them as reference pictures to estimate a prediction of a block that is currently being encoded (referred to as a current block) of a currently being decoded picture (referred to as a current picture). The encoder can search the reference pictures for a matched region which is the most similar to the current block, and use the matched region as a prediction of the current block. The searching process is referred to as motion estimation. At the same time, prediction parameters indicating a location of the matched region in a referenced picture can also be obtained. The prediction determined based on the motion estimation is referred to as a motion compensated prediction.

Subsequently, the encoder can determine differences between the current block and the prediction of the current block. These differences are referred to as a residual portion of the current block. The residual portion can be obtained by removing the prediction portion from the current block. The residual portion and the prediction parameters are then transmitted to a decoder.

During the decoding process at the decoder, the reference pictures used for decoding the current block are established and stored in a decoded picture buffer (DPB). The prediction portion of the above current block can be reconstructed based on the prediction parameters and with reference to the reference pictures in the DPB. Thereafter, the decoder can combine the reconstructed prediction portion with the received residual portion of the current block to generate a recovered block.

Figure 1:
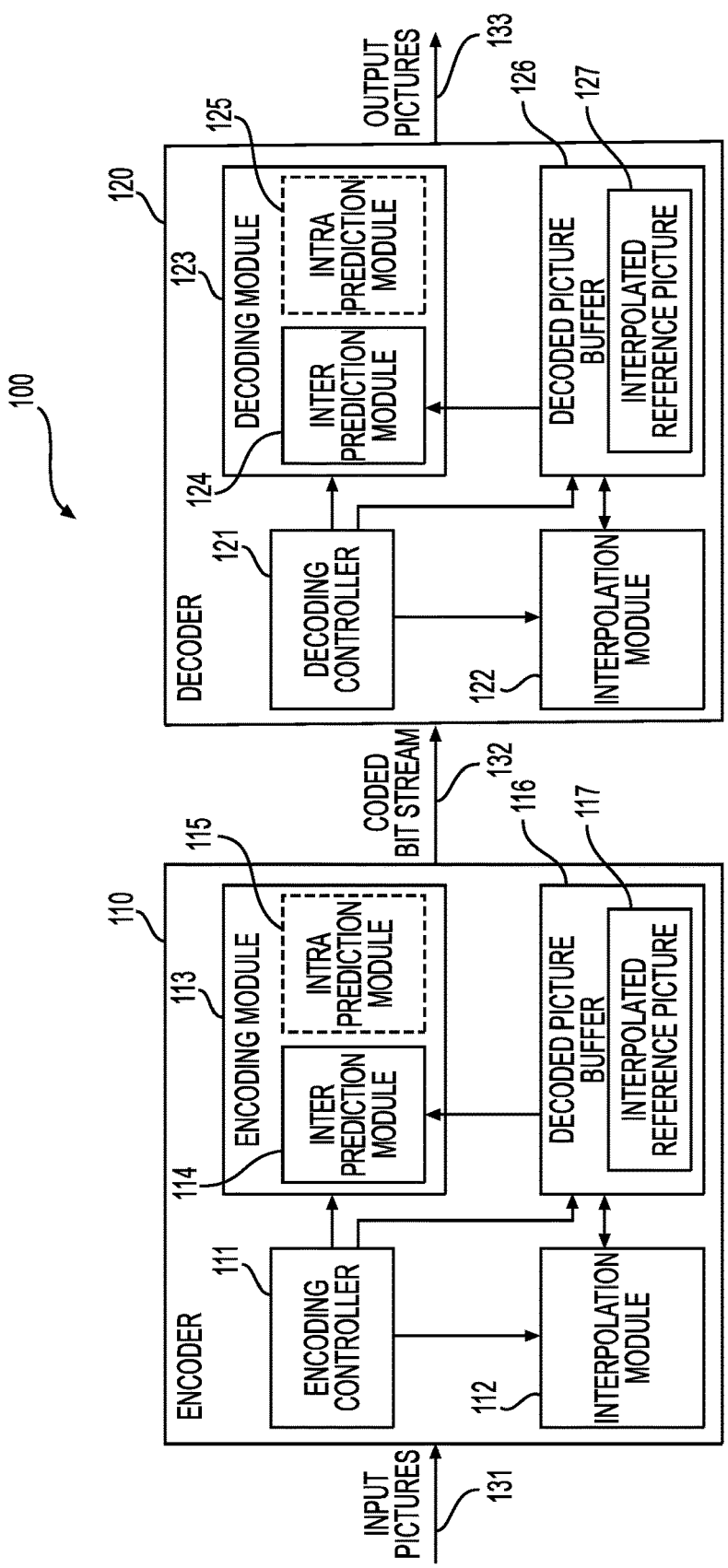
FIG. 1 shows an example video coding system coding pictures using an interpolated reference picture (IRP) according to an embodiment of the disclosure.

FIG. 1 shows an example video coding system 100 according to an embodiment of the disclosure. The video coding system 100 can include an encoder 110 and a decoder 120. The encoder 110 receives a sequence of input pictures 131 and performs an encoding process to compress the sequence of input pictures 131 into a coded bit stream 132 that can be transmitted from the encoder 110. The decoder 110 receives the coded bit stream 132 and accordingly performs a decoding process to generate a sequence of output pictures 133.

According to an aspect of the disclosure, in addition to previously encoded or decoded reference pictures, the video coding system 100 can employ one or more interpolated pictures as reference pictures for encoding or decoding operations. Interpolated reference pictures (IPRs) can be obtained from an interpolation process. During the interpolation process, pixel values of an IRP can be generated based on pixel values of previously encoded or decoded reference pictures using one of various interpolation methods. Compared with conventional video coding systems, employment of interpolated reference pictures (IRPs) can improve compression efficiency of a video coding system.

As shown in FIG. 1, the encoder 110 can be any device that converts input pictures 131 into a coded bit stream 132. For example, the encoder 110 can include an encoding controller 111, an interpolation module 112, an encoding module 113, and a decoded picture buffer 116. These components can be coupled together as shown.

The encoding controller 111 can be configured to coordinate and control the encoding process that employs IRPs. In one example, the encoding controller 111 is configured to determine a value of a variable before initiation of encoding a current picture. The variable can be employed to indicate whether the current picture is to be encoded using an IRP. In one example, the encoding controller 111 determines the value of the variable based on a size of the decoded picture buffer 116 and the reference pictures stored in the decoded picture buffer 116. A size of the decoded picture buffer 116 may refer to a number of picture buffers included in the decoded picture buffer 116. For example, when an IRP is to be used for encoding a current picture, the decoded picture buffer 116 should include at least three picture buffers: two for storage of two reference pictures which can be used for generation of the IRP, and one for storage of the IRP itself. When a current reference picture is to be simultaneously employed for encoding the current picture while the IPR is used for encoding the current picture, the decoded picture buffer 116 should include one more picture buffer for storage of the current reference picture. A current reference picture includes decoded blocks of a current picture and can be used as a reference picture for encoding the current picture. Accordingly, when the size of the decoded picture buffer 116 is smaller than three for usage of an IRP, or smaller than four for usage of an IRP and a current reference picture at the same time, the encoding controller 111 can determine that the size of the decoded picture buffer is not big enough for employment of an IRP for encoding a current picture. As a result, in one example, the encoding controller 111 can set the value of the variable to be, for example, 0 indicating the current picture is not encoded using an IRP.

In one example, during the encoding process, the encoding module 113 is configured to perform encoding of a current picture based on the value of the variable. For example, the encoding module 113 checks the value of the variable before initiation of encoding a current picture. When it is determined that the value of the variable equals to 0, the encoding module 113 will not encode the current picture using an IRP. Otherwise, the encoding module 113 can encode the current picture using an IRP.

In another example, the encoding controller 111 is configured to determine the value of the variable based on whether picture buffers in the decoded picture buffer 116 are available for storage of an IRP. For example, assuming two reference pictures for generation of the IRP are already stored in the decoded picture buffer 116, at least one more picture buffer is needed for storage of the IRP. In case that a current reference picture is simultaneously used for encoding the current picture while using the IRP, at least two more picture buffers are needed for storage the IRP and the current reference pictures. Accordingly, when picture buffers in the decoded picture buffer 116 are not available for storage of the IRP, the encoding controller 116 can set the value of the variable to be 0, for example, indicating the current picture is not encoded using an IRP.

In a further example, the encoding controller 111 is configured to determine the value of the variable based on whether two reference pictures for generation of an IRP exist in the decoded picture buffer 116. In order to generate an IRP, usually at least two reference pictures are employed. Accordingly, when the two reference pictures for generation of the IRP are not included in the decoded picture buffer 116, the encoding controller 111 can set the value of the variable to be 0.

In various examples, the encoding controller 111 can be configured to check one or more of a size of the decoded picture buffer 116, a number of available picture buffers associated with the decoded picture buffer 116 (i.e., whether the decoded picture buffer 116 is full), or availability of two reference pictures used for generation of an IRP to determine the value of the variable. When picture buffers for storage of an IRP, and/or two reference pictures for generation of an IRP are available, the encoding controller 111 can set the value of the variable to be, for example, 1, indicating the current picture is encoded using the IRP. Otherwise, the encoding controller can set the value of the variable to be, for example, 0, indicating the current picture is not encoded using the IRP. In some other examples, the value of the variable can be determined by one or a combination of a high-level syntax element which indicates whether the use of the IRP is enabled or disabled, the number of available picture buffer in the decoded picture buffer, and whether two different reference pictures are existent in the decoded picture buffer.

In one example, the encoding controller 111 is configured to trigger the interpolation module 112 to generate one or more IRPs. For example, the encoder 110 encodes the sequence of the input pictures 131 according to a pre-configuration which specifies a reference picture set for each of the input pictures 131. The reference picture set can include one or more IRPs for the respective picture. Accordingly, when encoding a current picture having a reference picture set that includes one or more IRPs, the encoding controller 111 can transmit a signal and trigger the interpolation module 112 to generate respective interpolated pictures. In one example, the encoding controller 111 may first determine a value of the variable as described above before transmission of the signal. When the value of the variable is determined to be, for example, 0, the encoding controller 111 may not proceed to trigger generation of an IRP.

In addition, in one example, the encoding controller 111 is configured to determine a set of interpolation parameters for generation of one or more IRPs. For example, the pre-configuration may specify interpolation parameters used for generation of the respective IRPs for the current picture. For example, the interpolation parameters may specify an interpolation method or reference pictures in a reference picture set to be used for generation of the IRPs. Accordingly, the encoding controller 111 can determine a set of interpolation parameters based on the pre-configuration, and transmit a signal indicating the interpolation parameters to the interpolation module 112.

In one example, the encoding controller 111 is further configured to manage the decoded picture buffer 116 for the encoding process. For example, members of the reference picture sets can be different for different pictures. Before starting to encode a current picture, the encoding controller 111 can remove from the decoded picture buffer 116 a reference picture used by a previous picture but useless for the current picture or other to be encoded pictures. Alternatively or additionally, the encoding controller 111 can add a reference picture, such as an IRP, to the decoded picture buffer 116. For example, the encoding controller 111 can command the interpolation module 112 to generate an IRP and store the IRP into the decoded picture buffer 116. A newly added reference picture may be used by the current picture or other to be encoded future pictures.

Particularly, in one example, the encoding controller 111 is further configured to manage the decoded picture buffer 116 for storage of one or more IRPs. For example, when a current picture is to be encoded, the encoding controller 111 can allocate a picture buffer for storage of an IRP used for encoding the current picture. For example, when no picture buffer is available in the decoded picture buffer 116 for storage of the IRP, the encoding controller 111 may remove a reference picture from the decoded picture buffer 116 to yield a picture buffer for storage of the IRP. In one example, after encoding the current picture using the IRP, the encoding controller 111 can remove the IRP from the decoded picture buffer 116. In one example, the encoding controller 111 may determine the IRP is to be used for encoding a future picture. Accordingly, the IRP for encoding the current picture can be retained in the decoded picture buffer 116.

The interpolation module 112 is configured to generate IRPs according to interpolation parameters received from or indicated by the encoding controller 111. The interpolation module 112 stores the IRPs to the decoded picture buffer 116.

The encoding module 113 is configured to encode blocks of the input pictures 131. A block of a picture refers to a region in a picture. In one example, the encoding module 113 includes an inter prediction module 114, so as to encode blocks of the input pictures using inter picture coding technique. In another example, the encoding module 113 may further include an intra prediction module 115, so that the encoding module 113 may encode blocks of the input pictures using either inter or intra picture coding techniques. The inter picture coding techniques use reference pictures to estimate a prediction of a current block. For example, when encoding a current block with inter picture coding techniques, motion estimation can be performed to search for a matched region in the reference pictures. The matched region is used as a prediction of the current block. In contrast, the intra picture coding techniques employ neighboring blocks of a current block to generate a prediction of the current block. The neighboring blocks and the current block are within a same picture.

In one example, the inter prediction module 114 is configured to perform inter picture coding to encode a block while the intra prediction module 115 is configured to perform intra picture coding to encode a block. Accordingly, a block encoded using inter picture coding is referred to as a inter coded block, while a block encoded using intra picture coding is referred to as an intra coded block.

The encoding module 113 can be configured to construct a reference picture list for encoding a current picture. For example, the current picture can include a plurality of inter coded blocks. The inter coded blocks each only reference one reference picture for inter picture coding. Such type of prediction is referred to as uni-prediction. Different inter coded blocks may reference different reference pictures. In such scenario, for each inter coded block, respective prediction parameters include an identifier indicating which reference picture is referenced. Accordingly, numerous such identifiers need to be transmitted. In order to reduce the number of bits used for transmitting the numerous identifies, a reference picture list is first constructed for the current picture, and an index into the position of a reference picture in the reference picture list is used as an identifier of the respective reference picture. The index is referred to as a reference index.

By arranging and optimizing positions of reference pictures in the reference picture list, an optimized coding efficiency can be obtained. Specifically, the most frequently referenced pictures can be positioned at a beginning of the reference picture list, resulting in smaller reference index values for the most frequently referenced pictures. Smaller index values can be encoded with shorter code words (fewer bits). Accordingly, an optimized coding efficiency for transmitting the reference indexes can be obtained.

In another example, a current picture can include inter coded blocks each referencing more than one reference pictures. For example, a block may reference two reference pictures, which is referred to as bi-prediction. Accordingly, the encoding module 113 can create two reference picture lists to facilitate two reference indexes for such a bi-prediction block.

In the above example, the reference picture lists are constructed at a picture level. However, in other examples, reference picture lists can be constructed in various ways, such as at a slice level. For example, a picture can be divided into multiple slices. Each slice can be decodable independent from other slices in the same picture. In this way, a loss of one slice during transmission does not affect other slices in the same picture. For a slice only including uni-prediction blocks, one reference picture list can be constructed for encoding such a slice, while for a slice including bi-prediction blocks, two reference picture lists can be employed.

In one example, when encoding a slice of a current picture, the encoding module 113 constructs one or more reference picture lists which can each include one or more IRPs. The construction can be based on a reference picture set associated with the current picture. A reference picture set includes various type of reference pictures used for encoding a picture. In one example, a reference picture set is predefined for a picture based on a configuration. In another example, the reference picture set is determined by an optimization process. During the optimization process, different encoding modes are tested and one optimal encoding mode is selected, and a reference picture set associated with then optimal encoding mode is accordingly determined. Different pictures can have different reference picture set.

In one example, reference pictures including IRPs are selected from the reference picture set of the current picture and disposed in a reference picture list. In addition, the construction of a reference picture list can be performed based on a default rule, or can be based on a signal indicating a rule from the encoder controller 111. For example, the default rule may specify an order for arranging reference pictures in a reference picture list, and accordingly a default reference picture list can be constructed. For another example, a default reference picture list may be further optimized resulting in a modified reference picture list. For another example, the encoding controller 111 can determine a rule describing in which order a reference picture list is to be constructed and command the encoding module 113 to perform construction accordingly. An order for arranging reference pictures in a reference picture list is referred to as an arrangement of the reference picture list.

The inter prediction module 114 is configured to perform inter picture coding to generate a prediction for a block belonging to a slice of a current picture. At the same time, based on reference lists constructed for the current picture or the slice, prediction parameters including one or more reference indexes are also generated. The prediction can then be utilized to generate a residual portion of the block. The residual portion and prediction parameters can be further processed and transmitted to the decoder 120.

The intra prediction module 115 is configured to perform intra picture coding for respective blocks. Encoding an intra coded block does not reference other pictures during the encoding process. Instead, previously encoded neighbor blocks of the intra coded block are used to calculate a prediction of the intra coded block. Various intra prediction modes can be employed to generate a prediction for a respective block. The prediction for the respective block can then be used to generate a residual portion of the respective block. Eventually, the residual portions and the intra prediction modes employed can be included in the coded bit stream 132 and transmitted to the decoder 120.

In one example, the inter prediction module 114 is configured to employ an intra block copy (IBC) technique, which uses a version of a current picture as a reference picture that is stored in the decoded picture buffer 116. The version of the current picture includes previously decoded blocks of the current picture, and is referred to as the current reference picture. For example, a current block of a current picture is to be encoded using intra block copy, and the inter prediction module 114 operates in an intra block copy mode. During the encoding process, a current reference picture is stored in the decoded picture buffer 116. When encoding the current block, the inter prediction module 114 performs a motion estimation and search for a matched region in the previously encoded blocks that are stored in the decoded picture buffer 116. As a result, a prediction of the current block and associated prediction parameters indicating the matched region can be obtained. As an example, an intra block copy tool is provided in the High Efficiency Video Coding (HEVC) Screen Content Coding (SCC) standard.

In one example, a current picture includes blocks part of which are encoded using inter picture coding with IRPs and part of which are encoded using intra block copy. When encoding such a current picture, the respective IRPs and a current reference picture are simultaneously stored in the reference buffer 116.

The decoded picture buffer 116 is configured to store reference pictures used for inter picture coding or intra block copy. Specifically, one or more IRPs 117 can be stored in the decoded picture buffer 116 when ones of the input pictures 131 are to be encoded with IRPs. In one example, the decoded picture buffer 116 includes multiple picture buffers each of which can be assigned for storing a reference picture.

The coded bit stream 132 includes coded video data and various parameters describing various aspects of coded picture sequences. The video data can include, for example, prediction parameters for either inter or intra coding, data corresponding to residual portions, and the like. The various parameters can include, for example, a variable indicating whether a picture being encoded using an IRP, interpolation parameters, reference picture set information, reference picture list construction information, and the like. Typically, a coded bit stream can have a structure specified by syntax and accordingly include various syntax elements. Syntax for defining a coded bit stream can be specified by certain video coding standards, such as the HEVC standard.

In one example, syntax of the coded bit stream 132 has a hierarchical structure including a video sequence level, and a picture level. Accordingly, parameters are organized as sequence parameter sets (SPS) and picture parameter sets (PPS). Parameters in a SPS are associated with a sequence of pictures, while parameters in a PPS are associated with one or more pictures. In addition, the hierarchical structure can include a slice level, and a slice segment header is employed to carry parameters associated with a slice or a slice segment. A slice can include one or more slice segments each having a slice segment header. In one example, slice segments in a slice can share information in a slice segment header of first slice segment. The slice segment header may include an index for referring to a PPS to obtain picture level parameters useful for processing the respective slice. Similarly, a PPS may include an index for referring to a SPS to obtain sequence level parameters useful for process the respective picture. The PPS, SPS, and slice segment header are three types of syntax elements among other types of syntax elements.

Accordingly, in one example, the encoding controller 111 is configured to generate respective syntax elements for signaling various parameters or configurations for usage of IRPs to the decoder 120. For example, a variable indicating whether a picture is encoded using an IRP can be included in a PPS. For example, a flag indicating usage of IRPs can be generated and included in a PPS associated with a picture in the sequence of the pictures 131. A set of interpolation parameters for generation of the IRPs can be included in a PPS associated with the picture. In addition, a reference picture set including the IRPs can be determined and information describing such a reference picture set can be included in a PPS associated with the picture. Further, a flag indicating usage of an IRP for encoding a slice can be generated and included in a slice segment header of the slice. Information indicating how one or more reference lists can be generated may be included in the slice segment header or a PPS reference by the slice. The above generated syntax elements can be included in the coded bit stream 132 and transmitted to the decoder 120. Alternatively, in some examples, a value of the variable indicating whether a picture is encoded using the IRP (i.e., need to be decoded using the IRP), the set of interpolation parameters for generation of the IRP, or the arrangement of a reference picture list that includes the IRP can be implicitly derived by the decoder 120.

As shown in FIG. 1, the decoder 120 includes a decoding controller 121, an interpolation module 122, a decoding module 123, and a decoding picture buffer (DPB) 126. In operation, the decoder 120 receives the coded bit stream 132 that includes the coded video data and the various parameters and processes coded video data according to the various parameters to generate the output pictures 133.

The decoding controller 121 is configured to control the decoding process performed by the decoder 120. In one example, the decoding controller 121 receives various syntax elements indicating usage of IRPs. For example, the decoding controller 121 receives a flag in a PPS indicating usage of one or more IRPs for decoding a picture. In one example, when decoding a current picture, the decoding controller 111 can check slice segment headers of the slices in the current picture. The slice segment headers may reference the above PPS that includes the flag. In this way, the decoding controller 121 can locate the PPS and learn IRPs are used for decoding the current picture.

In one example, the decoding controller 121 is configured to determine a set of interpolation parameters for generation of one or more IRPs. For example, the decoding controller 121 can determine a set of interpolation parameters for decoding a current picture based on one or more syntax elements in the coded bit stream 132. Specifically, in one example, the decoding controller 121 can receive a set of interpolation parameters for generation of the one or more IRPs in the same PPS or another different PPS. Alternatively, in another example, the decoding controller 121 may receive indicators indicating one of multiple sets of preconfigured interpolation parameters stored at the decoder 120. The decoding controller 121 can accordingly transmit a signal to trigger the interpolation module 122 to generate the respective IRPs used for decoding the current picture. The signal may indicate or include the set of interpolated parameters. In alternative example, no syntax elements indicating interpolation parameters are included in the bit stream, and the decoding controller 121 can determine a set of interpolation parameters based on a pre-configuration.

In another example, when decoding the above current picture, the decoding controller 121 can first determine a value of a variable indicating whether to use the respective IRPs for the decoding process before triggering the interpolation module 122 to generate respective IRPs. In one example, the decoding controller 121 determines the value of the variable based on a syntax element in the coded bit stream. For example, a variable indicating whether the current picture is coded using an IRP can be included in a PPS. The variable in the PPS can be used to determine the value of the variable indicating whether to use the respective IRPs for the decoding process. For another example, a flag in a PPS or SPS indicating the current picture being encoded using an IRP can be received. Accordingly, the decoding controller 121 can set the value of the variable to be, for example, 1, indicating the current picture is to be decoded using an IRP. In contrast, when no syntax element indicating usage of an IRP for encoding the current picture, the decoding controller 121 can set the value of the variable to be, for example, 0 indicating the current picture is not to be decoded using an IRP.

In another example, the decoding controller 121 may determine the value of the variable based on some conditions. For example, the decoding controller 121 may check a maximum size of the DPB 126 and the reference pictures already stored in the DPB 126 so as to get a number of available picture buffers in the DPB 126, and accordingly to determine the value of the variable. For example, assuming one IRP is going to be used for decoding a current picture, the DPB 126 needs to have at least three picture buffers available: one for the IRP, two for previously decoded reference pictures for generating the IRP. Assuming the current picture also employs intra block copy, an additional picture buffer is required for storing a current reference picture. When a size of the DPB 126 is smaller than 3 (intra block copy is not used) or 4 (intra block copy is used), decoding with the respective IRPs cannot be performed. Alternatively, when a number of available picture buffers are smaller than what are needed for storing two reference pictures for generation of an IRP, the IRP, or a current reference picture, decoding with the respective IRPs cannot be performed, either. When picture buffers in the DPB 126 are available, the decoding controller 121 can set the value of the variable to be, for example, 1, indicating the current picture can be decoded using the IRP.

Additionally, in one example, the decoding controller 121 may check whether decoded reference pictures used for generation of the respective IRPs are available in the DPB 126. When the decoded reference pictures are available, the decoding controller 121 can set the value of the variable to be, for example, 1, indicating the current picture is to be decoded using the IRP.

In various examples, in order to determine a value of the variable, the decoding controller 121 may check one or more conditions of whether a high-level syntax element indicates that using the IRP is enabled, whether picture buffers are available for decoding the current picture using IRP, or whether two reference pictures for generation of the IRP are available in the DPB 126. When the high-level syntax element indicating the use of IRP in disabled, picture buffers are not available for storing the respective IRPs (and a current reference picture, when intra block copy is employed), or decoded reference pictures for generation of IRPs are not available, the decoding controller 121 may determine using IRPs to decoding respective pictures is not possible. The decoding controller 121 may set the value of the variable to be, for example, 0, indicating the current picture cannot be decoded using the IRP. In contrast, when checked one or more conditions are satisfied for decoding the current picture using an IRP, the decoding controller 121 may set the value of the variable to be, for example, 1, indicating the current picture is to be decoded using the IRP. In some other examples, the value of the variable can be determined by one or a combination of a high-level syntax element which indicates whether the use of the IRP is enabled or disabled, the number of available picture buffer in the decoded picture buffer, and whether two different reference pictures are existent in the decoded picture buffer.

Accordingly, in some examples, the decoding module 123 performs the decoding process based on the value of the variable. For example, when decoding a current picture, the decoding module 123 can first check the value of the variable which may be stored in a memory (not shown). When the value of the variable is set to be a value indicating the current picture is not to be decoded using an IRP, the decoding module 123 does not perform a decoding process using an IRP. When the value of the variable is set to be a value indicating the current picture is to be decoded using an IRP, the decoding module 123 initiates to decode the current picture using an IRP.

In one example, the decoding controller 121 is configured to perform DPB management functions. For example, the decoding controller 121 can receive a PPS including a reference picture set for decoding a current picture. The reference picture set can include IRSs or/and a current reference picture in addition to other types of reference pictures. Based on the reference picture set, the decoding controller 121 can mark reference pictures used by a previous picture but not used by the current picture as non-reference pictures which can be removed from the DPB 126 after being displayed. Additionally, the decoding controller 121 can command the interpolation module 122 to generate and store IRPs used for decoding the current picture in the DPB 126.

Particularly, in one example, the decoding controller 121 is further configured to manage the DPB 126 for storage of one or more IRPs. For example, when a current picture is to be decoded, the decoding controller 121 can allocate a picture buffer for storage of an IRP used for decoding the current picture. For example, when no picture buffer is available in the DPB 126 for storage of the IRP, the decoding controller 121 may remove a reference picture from the DPB 126 to yield a picture buffer for storage of the IRP. In one example, after decoding the current picture using the IRP, the decoding controller 121 can remove the IRP from the DPB 126. In one example, the decoding controller 121 may determine the IRP is to be used for decoding a future picture. Accordingly, the IRP for decoding the current picture can be retained in the DPB 126.

The decoding module 123 is configured to decoding blocks of coded pictures carried in the coded bit stream. Specifically, the decoding module 123 receives inter coding or intra coding prediction parameters corresponding to a block in a current picture and generate a prediction portion of the block accordingly. The prediction portion can then be combined with a residual portion generated from other components (not shown) of the decoder 120 to obtain a decoded block.

In one example, when decoding a current picture, the decoding module 123 performs a reference picture list construction process to construct one or more reference lists. The constructed reference lists can be used for referencing reference pictures for decoding a block of the current picture. In one example, the current picture includes multiple slices. Each slice can be decoded independently with respect to other slices in the current picture. Each slice can include a plurality of blocks, part of which are encoded using inter picture coding. Among those inter coded blocks, a block that is encoded using uni-prediction can have prediction parameters including a reference index into a reference picture list, while a block that is encoded using bi-prediction can have prediction parameters including two reference indexes associated with two reference picture lists respectively. During the encoding process at the encoder 110, the above reference picture lists are constructed to enable creation of the reference indexes of the prediction parameters. Now at the decoder 120, the same set of reference picture lists can be reconstructed. With help of the reconstructed reference picture lists, reference pictures for decoding the respective inter coded blocks can be determined.

In one example, reference picture lists are defined on slice level. Different slices may have the same or different set of reference picture lists. Accordingly, when decoding a slice of the current picture, the decoding module 123 first performs the reference picture list construction process to construct respective one or more reference picture list for the slice. For example, when decoding a slice of the current picture, the decoding module 123 receives a slice segment header including a flag indicating the respective slice is coded using one or more IRPs. Accordingly, the decoding module 123 initiates to construct one or more reference picture lists at least one of which includes one or more IRPs for the slice.

In one example, the decoding module 123 constructs a reference picture list for a slice based on a reference picture set defined for a current picture including the slice. For example, reference pictures in the reference picture set are selected and disposed in the reference picture list.

In addition, the decoding module 123 constructs the reference picture list for the slice based on a construction rule which specifies an arrangement of a reference picture list. For example, the construction rule specifies how the reference picture list is constructed, for example, which reference pictures in the DPB 126 are selected, in what order those selected reference pictures are arranged in the reference picture list. The construction rule can be indicated or specified by a syntax element carried in a slice segment header of the slice. Alternatively, the construction rule can be a default rule. When no syntax element indicting or specifying a rule is received, the decoding module 123 performs the construction according to the default rule. Either the rule indicated or specified by the syntax element, or the default rule is the same as the rule employed by the encoder 110 for constructing the reference picture list for the same slice at the encoder 110.

In one example, the decoding controller 121 is configured to determine an arrangement of a reference picture list for decoding a slice or a picture, and the decoding module 123 constructs the reference picture list according to the arrangement of the reference picture list determined by the decoding controller 121. For example, the decoding controller 121 can determine an arrangement of a reference picture list based on a syntax element which indicate or include the arrangement of the reference picture list. Alternatively, no syntax element indicating or including an arrangement of a reference picture list is carried in the coded bit stream, and the decoding controller 121 determines an arrangement of a reference picture list based on a pre-configuration which specifies a default arrangement of a reference picture list.

In one example, the decoding module 123 includes an inter prediction module 124. In another example, the decoding module 123 may further include an intra prediction module 125. The inter prediction module 124 is configured to process an inter coded block (a block encoded by inter picture coding) and generate a prediction portion of the inter coded block. For example, an inter coded block (a current block) of a current slice in a current picture is being processed. The current block is encoded using uni-prediction, and prediction parameters of the current block include a reference index into a reference picture list of the current slice. Based on the reference index and a constructed reference list of the current slice, a reference picture can be determined. The prediction parameters can further include motion information such as an index associated with a motion vector for indicating a location of a matched region in the reference picture with respect to a location of the current block in the current picture. Accordingly, a prediction of the current block can be obtained.

In one example, the intra prediction module 125 is configured to process an intra coded block (a block encoded by intra picture coding) and generate a prediction portion of the intra coded block. For example, prediction parameters of an intra coded block can include intra mode information. Based on the intra mode information and previously decoded neighboring blocks of the intra coded block, the intra prediction module 125 can construct a prediction of the intra coded block.

In another example, the inter prediction module 124 is configured to process a block encoded by intra bock copy and generate a prediction portion of the block. For example, a current reference picture prior to in-loop filtering is stored in the DPB 126 and used as a reference picture, and a current block that is previously coded using intra block copy is being processed. The current reference picture includes decoded blocks of the current picture. The current block can have prediction parameters including information associated with a motion vector indicating a location of a decoded neighboring block in the current picture. Accordingly, a prediction of the current block can be obtained.

The DPB 126 is configured to store reference pictures used for decoding blocks encoded by inter picture coding or intra block copy. Specifically, one or more IRPs 127 can be stored in the decoded picture buffer 126 when decoding pictures that are encoded with IRPs. In one example, the decoded picture buffer 126 includes multiple picture buffers each of which can be assigned for storing a reference picture.

It is noted that the system 100 is a simplified system for purpose of illustrating the encoding and decoding processes using IRPs. The encoder 110 and the decoder 120 of the system 100 can include other components useful for performing the encoding or decoding processes which are not shown in FIG. 1.

Figure 2A:
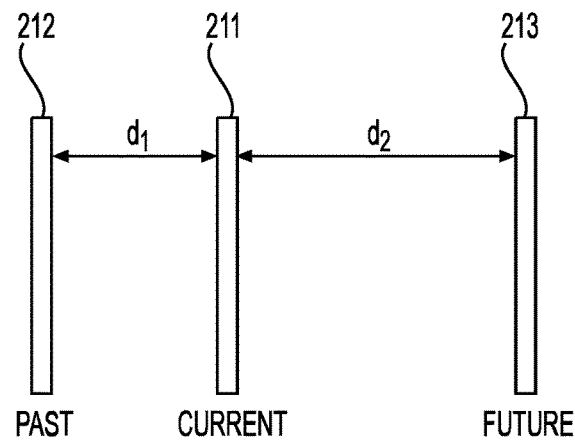
FIGS. 2A-2C show examples of a first IRP generation method according to an embodiment of the disclosure.
Figure 2B:
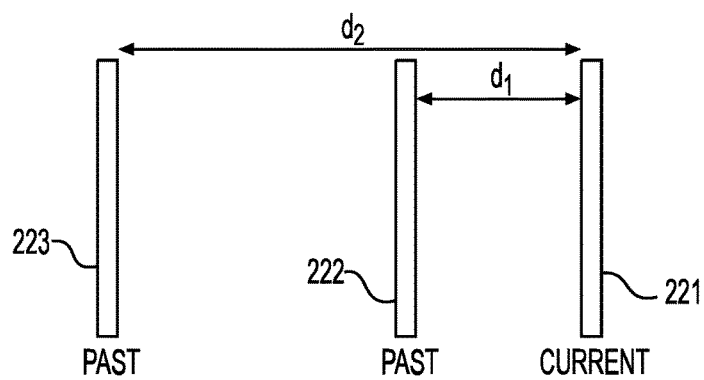
Figure 2C:
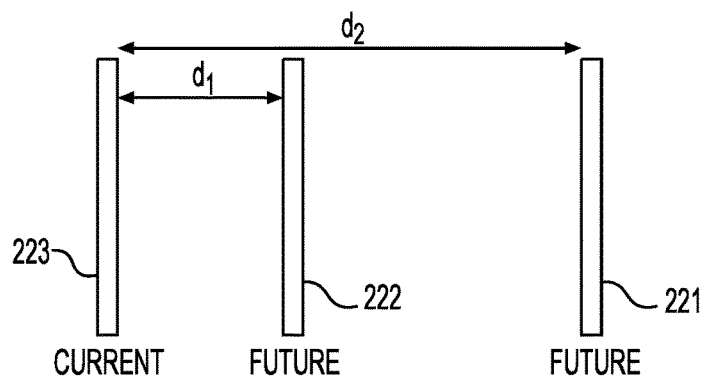

FIGS. 2A-2C show examples of a first IRP generation method according to an embodiment of the disclosure. The IRP generation method shown in FIGS. 2A-2C is referred to as weighted picture average. The weighted picture average method can be employed at either the encoder 110 or the decoder 120 in FIG. 1 example for IRP generation. The decoder 120 is used as an example for explanation of the weighted picture average method.

FIG. 2A shows three pictures 211-213 disposed in output (display) order. The picture 211 is a current picture being processed, decoding of which uses an IRP. The picture 212 is a past reference picture with respect to the current picture (i.e., the picture order count (POC) value of picture 212 is smaller than that of the current picture 211), while the picture 213 is a future reference picture with respect to the current picture (i.e., the picture order count value of picture 213 is larger than that of the current picture 211). The past and future reference pictures 212-213 are decoded pictures stored in the DPB 126. The past reference picture 212 is a distance of d1 away from the current picture 211. The future reference picture 21 is a distance of d2 away from the current picture 211. A sequence of pictures are typically displayed at a constant rate and a constant period is between two adjacent pictures. Accordingly, a distance between two pictures in output order refers to a number of periods among the two pictures.

In the FIG. 2A example, the IRP for decoding the current picture 211 can be obtained by calculating a weighted picture average between the past and future reference pictures 212-213. For example, a pixel value of an interpolated pixel in the IRP can be represented as Pi, and the pixel value Pi can be calculated according to the following expression, $$Pi = \frac{d1}{d1+d2}Pp + \frac{d2}{d1+d2}Pf, \qquad (1)$$

where Pp represents a pixel value of a pixel in the past reference picture 212 located at the same location as the interpolated pixel, and Pf represents a pixel value of a pixel in the future reference picture 213 located at the same location as the interpolated pixel. Pixel values of pixels in the IRP form a weighted picture average between the past and future reference pictures 212-213.

FIG. 2B shows a current picture 221, a first past reference picture 222, and a second past reference picture 223. A distance between the pictures 221 and 222 is d1, and a distance between the pictures 221 and 223 is d2. Similarly, an IRP for decoding the current picture 221 can be obtained by calculating a weighted picture average using the expression (1).

FIG. 2C shows a current picture 231, a first future reference picture 232, and a second future reference picture 233. A distance between the pictures 231 and 232 is d1, and a distance between the pictures 231 and 233 is d2. Similarly, an IRP for decoding the current picture 231 can be obtained by calculating a weighted picture average using the expression (1).

In some examples, the weighting assigned to each reference picture can be the same. Alternatively, the weighting assigned to each reference picture can be depending on the temporal distance to the current picture (e.g., higher weighting assigned to a reference picture closer to current picture). The weighting may also be specified by the encoder side and signalled to the decoder side.

Figure 3A:
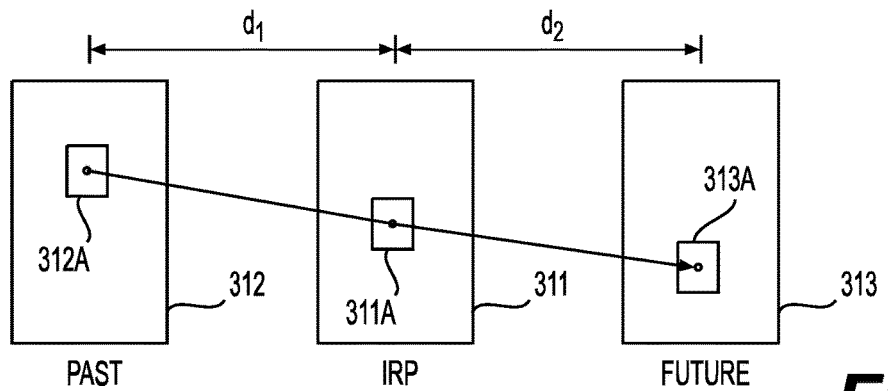
FIGS. 3A-3C show examples of a second IRP generation method according to an embodiment of the disclosure.
Figure 3B:
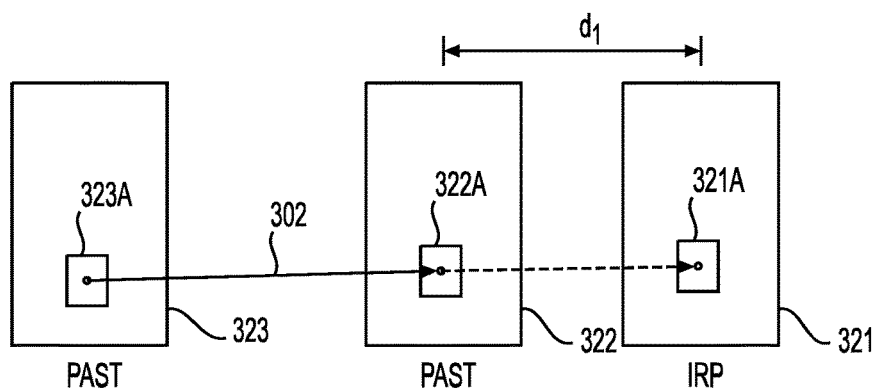
Figure 3C:
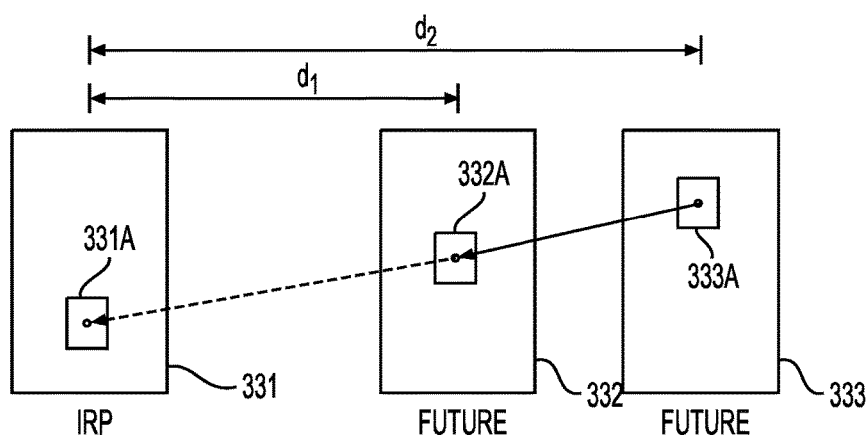

FIGS. 3A-3C show examples of a second IRP generation method according to an embodiment of the disclosure. The IRP generation method shown in FIGS. 3A-3C is referred to as motion compensated interpolation method. The motion compensated interpolation method can be employed at either the encoder 110 or the decoder 120 in FIG. 1 example. The decoder 120 is used as an example for explanation of the motion compensated picture interpolation method.

FIG. 3A shows a past reference picture 312 and a future reference picture 313 with respect to a current picture (not shown) being processed at the decoder 120. The past reference picture 312 and the future reference picture 313 each have a distance, d1 and d2, respectively, from the current picture. FIG. 3A also shows an IRP 311 that is used for decoding the current picture and needs to be constructed. As shown, the IRP 311 is disposed at a position having a distance d1 from the picture 312 and a distance d2 from the picture 313 in FIG. 3A.

In one example, in order to obtain the IRP 311, the interpolation module 122 first performs motion estimation for blocks in the future reference picture 313 with reference to the past reference picture 312. As a result, a motion vector field can be obtained that includes a plurality of motion vectors each corresponding to a block in the future reference picture 313. The motion vectors in the motion vector field each terminates at a block of the future reference picture 313 and initiates from a reference block in the past reference picture 313.

FIG. 3A shows a motion vector 301 which is one of the motion vector filed. The motion vector starts from a block 312a in the past reference picture 312 and ends at a block 313a in the future reference picture 313. The motion vector 301 passes through a block 311a in the IRP 311. A point where the motion vector 301 passes through the IRP 311 can be determined based on locations of the blocks 313a and 312a and the distances d1 and d2. Pixel values of pixels in the block 311a can then be similarly calculated using the expression (1) in FIG. 2A example where pixel values of the blocks 311a, 312a, and 313a substitute pixel values of the pictures 211, 212, and 213, respectively. In another example, pixel values of one of the blocks 312a and 313a which is closer to the current picture are used as that of the block 311a.

In one example, the above process of determining pixel values based on the motion vector 301 is repeated for each motion vector in the motion vector field. It is possible that a block in the IRP 311 may have multiple motion vectors passing through while another block may have zero motion vectors passing through. For the former case, in one example, one of the multiple set of pixel vales calculated from multiple motion vectors is selected to be the pixel values of the block. For the latter case, in one example, a neighboring block of a block without a vector passing through in the IRP 311 is selected and pixel values of the selected neighboring block are used as the pixel values of the other block. The above process for calculating pixel values of the IRP 311 is referred to as motion compensated picture interpolation.

FIG. 3B shows two past reference pictures 322 and 323 with respect to a current picture (not shown) in output order. The two past reference pictures 322 and 323 each have a distance, d1 and d2, from the current picture. FIG. 3B also shows an IRP 321 which is used for decoding the current picture and to be calculated based on the two past reference pictures 322 and 323. As shown, the IRP 321 is disposed at a position having a distance d1 from the picture 312 and a distance d2 from the picture 313. Similarly, a motion compensated picture interpolation as described below can be performed to obtain pixel values of the IRP 321.

For example, the interpolation module 122 can first perform motion estimation to obtain a motion vector field. For example, the motion estimation can be performed for blocks in the first past reference picture 322 with reference to the second past reference picture 323. Subsequently, for each motion vector, pixel values of block passed through by the respective motion vector can be calculated. As an example, a motion vector 302 initiates from a block 323a in the second picture 323 and terminates at a block 322a. Accordingly, a block 321a in the IRP 321 can be determined by extending the motion vector 302. Subsequently, pixel values of the block 321a can be calculated using the expression (1) in FIG. 2A example, where pixel values of the blocks 321a, 321a, and 323a substitute pixel values of the pictures 211, 212, and 213, respectively. In a similar way, blocks in the IRP 321 without motion vector passing through or with multiple motion vectors passing through can be processed. Eventually, pixel values of the IRP 321 can be obtained.

FIG. 3C shows two future reference pictures 332 and 333 with respect to a current picture in output order. The pictures 332 and 333 each have a distance, d1 and d2, from the current picture. FIG. 3C also shows an IRP 331 used for decoding the current picture which is disposed at a location shown on FIG. 3C. In a way similar to FIG. 3B example, a motion compensated picture interpolation can be performed to calculate the IRP 331. As an example, a motion vector 303 is shown which initiates from a block 333a and terminates at a block 332a. A block in the IRP 331 can be determined by extending the motion vector 303. Subsequently, the expression (1) in FIG. 2A example can be employed to calculating pixel values of the block 331a.

In each of the examples of FIGS. 3A-3C, IRPs and future or past reference pictures are divided into blocks in a same manner. Accordingly, numbers of blocks are the same for IRPs and future or past reference pictures, and each block has a same size. In addition, monochrome pictures having a single luma or chroma component are used to explain the IRP generation methods in the above example. For pictures include multiple components, a block may have pixel values corresponding to different components. Accordingly, pixel values corresponding to a respective component can form a block, and the method described herein can thus be applied to such a block.

In one example of the encoding and decoding process performed in the video coding system 100, the encoding controller 111 indicates or transmits a set of interpolation parameters to the interpolation module 112. The interpolation module 112 accordingly generates IRPs. In addition, the interpolation parameters are signaled to the decoder 120, such that the same IRPs can be constructed at the decoder 120 for decoding a picture which is encoded at the encoder with reference to the respective IRPs.

In one example, multiple sets of preconfigured interpolation parameters are predefined and stored at the encoder 110 as well as the decoder 110. Each set of interpolation parameters can include a method for IRP generation (for example, weighted picture average or motion compensated interpolation), distances of reference pictures used for generation of an IRP from a current picture, identifies of respective reference pictures (e.g., picture order count (POC)), weighting for each reference picture, and the like. For current pictures, different set of interpolation parameters may be applicable. Accordingly, an index indicating a set of interpolation parameters are included in a syntax element (such as a PPS) in the coded bit stream 132 and transmitted to the decoder 120. At the decoder 120, based on this index, the set of interpolation parameters can be determined for a current picture.

In another example, a default set of interpolation parameters are used at the encoder for encoding a picture, and no information of the set of interpolation parameters are signaled. With absent of information of which set of interpolation parameters in the coded bit stream 132, the decoder 120 employs the default set of interpolation parameters. In a further example, a set of interpolation parameters are explicitly signaled to the decoder 120, for example, by including the interpolation parameters in a PPS. The set of interpolation parameters can be one of multiple sets of preconfigured interpolation parameters, or can be different from the preconfigured multiple sets of interpolation parameters.

Figures 4A, 4B:
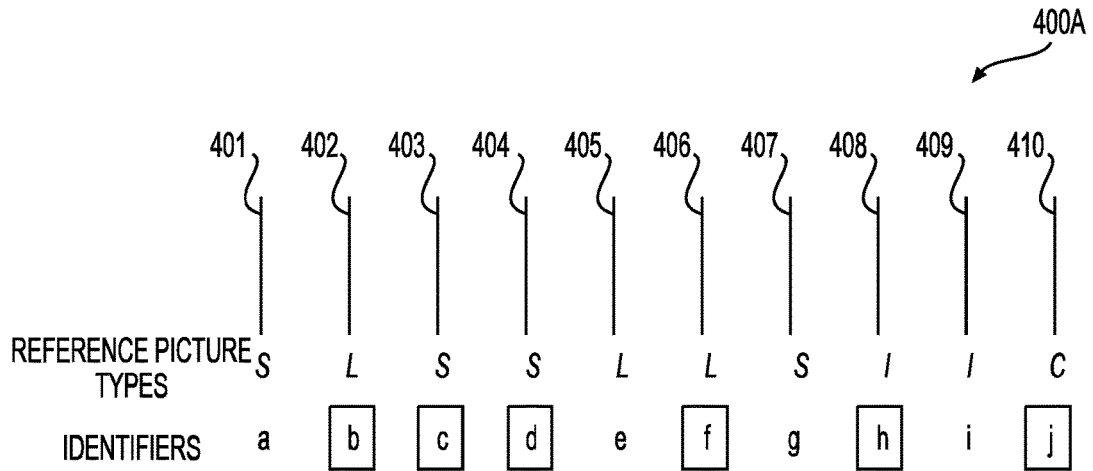
FIGS. 4A-4B show reference picture list construction examples according to an embodiment of the disclosure.

FIGS. 4A-4B show reference picture list construction examples according to an embodiment of the disclosure. FIG. 4A shows a reference picture set 400A corresponding to a current picture. The reference picture set 400A includes reference pictures 401-410 for encoding (or decoding) slices or blocks to be encoded (or encoded) by inter picture coding or intra block copy in the current picture. In FIG. 4A example, the reference pictures 401-410 are shown in an order of buffer memory locations, for example, in the DPB 126. Each location stores a respective reference picture. The order in FIG. 4A can be different from output order or coding order of the reference pictures 401-410.

The first seven reference pictures 401-407 are decoded pictures in a picture sequence, and can be categorized into a set of short term reference pictures 401, 403, 404, and 407, and a set of long term reference pictures 402, 405, and 406. Typically, short term reference pictures refer to pictures within a temporal proximity of the current picture. For example, a temporal picture coding structure, referred as a Group of Pictures, can be defined. Reference pictures in the same Group of pictures as the current picture can be defined as short term reference pictures. In contrast, long term reference pictures refer to pictures far from the current picture, for example, outside of a Group of Pictures defined containing the current picture. As an example, the HEVC standard defines long term reference pictures and short term reference pictures.

In addition to the short term and long term pictures 401-407 which are previously decoded pictures, the reference picture set 400A also includes IRPs 408-409 which are generated based on decoded pictures. The decode pictures for generation of the IRPs may be included in the current reference picture set 400A or previous reference picture sets used by previously decoded pictures. Further, in case the current picture includes blocks encoded using intra block copy, a current reference picture can be included in the reference picture set 400A.

As shown, reference picture types are provided below each reference pictures where S represents a short term reference picture, L represents a long term reference picture, I represents an IRP, while C represents a current reference picture. In addition, identifiers, a-j, are shown below each reference pictures. In other examples, POCs are used to identify the decoded reference pictures 401-407, and special indexes can be assigned to IRPs or the current reference pictures to represent respective reference pictures. In FIGS. 4A-4B example, a part of members of the reference picture set 400A are selected to construct a reference picture list for processing a slice in the current picture. For example, the reference pictures 402-404, 406, 408, and 410 are selected for constructing a reference picture list. The selections are indicated by a frame surrounding the identifiers of the selected reference pictures, or based on a predetermined rule.

FIG. 4B shows examples of arrangements of constructed reference lists in a table 400B according to an embodiment of the disclosure. For example, in FIG. 1 example, the decoding module 123 in the decoder 120 or the encoding module 113 in the encoder 110 construct one or more reference picture lists at the beginning of decoding or encoding a current slice of a current picture. Based on the constructed reference picture lists, reference indexes can be generated for referencing a reference picture. In one example, IRPs are employed for encoding or decoding the current picture. Accordingly, the decoding module 123 or encoding module 113 can construct one or more reference picture lists each including one or more IRPs using one of the arrangements in the table 400B. A reference picture list arrangement defines which reference pictures are included in the respective reference list and in what order.

The column 411 shows a first arrangement where one or more IRPs are disposed at the end of a reference picture list assuming no intra block copy is employed in the current slice. Specifically, in the example, two short term reference pictures c and d are arranged at the beginning of the constructed reference picture list followed by two long term reference pictures b and f. The IRP h is located at the end of the reference picture list.

The column 412 shows a second arrangement where one or more IRPs are disposed between short term and long term reference pictures assuming no intra block copy is employed in the current slice. Specifically, in the example, two short term reference pictures c and d are arranged at the beginning of the constructed reference picture list followed by the IRP h. Two long term reference pictures b and f are disposed at the end of the reference picture list.

The columns 413-416 show reference picture list arrangements where intra block copy is employed and the current reference picture j is included in the reference picture list. Specifically, in columns 413 and 414, the IRP h and the current reference picture j are disposed at the end of the reference picture list, and positions of the reference pictures h and j are exchanged for the two arrangements in columns 413 and 414. In columns 415 and 416, the reference pictures h and j are disposed between the short term and long term reference pictures, and positions of the reference pictures h and j are exchanged for the two arrangements in columns 415 and 416.

The column 417 shows an arrangement that is specified by a syntax element. For example, arrangements different from the arrangements shown in columns 411-416 can be employed. For example, an IRP can be arranged in an arbitrary position in a reference list for example, according to determination of an encoder or decoder.

It is noted that in various examples, sizes of reference picture sets can vary, and numbers of IRPs, short term reference pictures and long term reference picture can vary. Accordingly, reference picture arrangements can be adjusted to match different sizes and numbers. It is noted that arrangements of a reference picture including an IRP are not limited to examples shown in FIG. 4B example. An IRP can be disposed at any position of a reference picture list. For example, in FIG. 4B example, the IRP h can be disposed at the beginning of a reference picture list, a default position of the reference picture list, a specific position of the reference picture list specified in a high-level syntax element, or at a position among the short term or long term reference pictures.

In various examples, an arrangement of a reference picture list including an IRP can be signaled from the encoder 110 to the decoder 120 in multiple ways. For example, an index can be assigned to a possible reference picture list arrangement option such as options listed in the table 400B or options not listed in the table 400B. The index can be included in a syntax element, such as a PPS, or a slice segment header, and transmitted in the coded bit stream 132. For another example, one of arrangement options listed or not listed in the table 400B can be configured as a default arrangement at the encoder 110 and the decoder 120, and no associated syntax element is transmitted. For a further example, a reference picture list arrangement can be explicitly included in a syntax element, such as a PPS or a slice segment header and transmitted from the encoder 110 to the decoder 120. The reference picture list arrangement explicitly signaled can be one of multiple pre-configured arrangement options 411-416, or can be different from the pre-configured arrangement options 411-416.

Accordingly, in one example, corresponding to one of the above multiple ways, the encoding controller 111 generates and transmits the respective syntax indicating a reference picture list arrangement, while the decoding module 123 receives the respective syntax and perform reference picture list construction accordingly.

Figure 5:
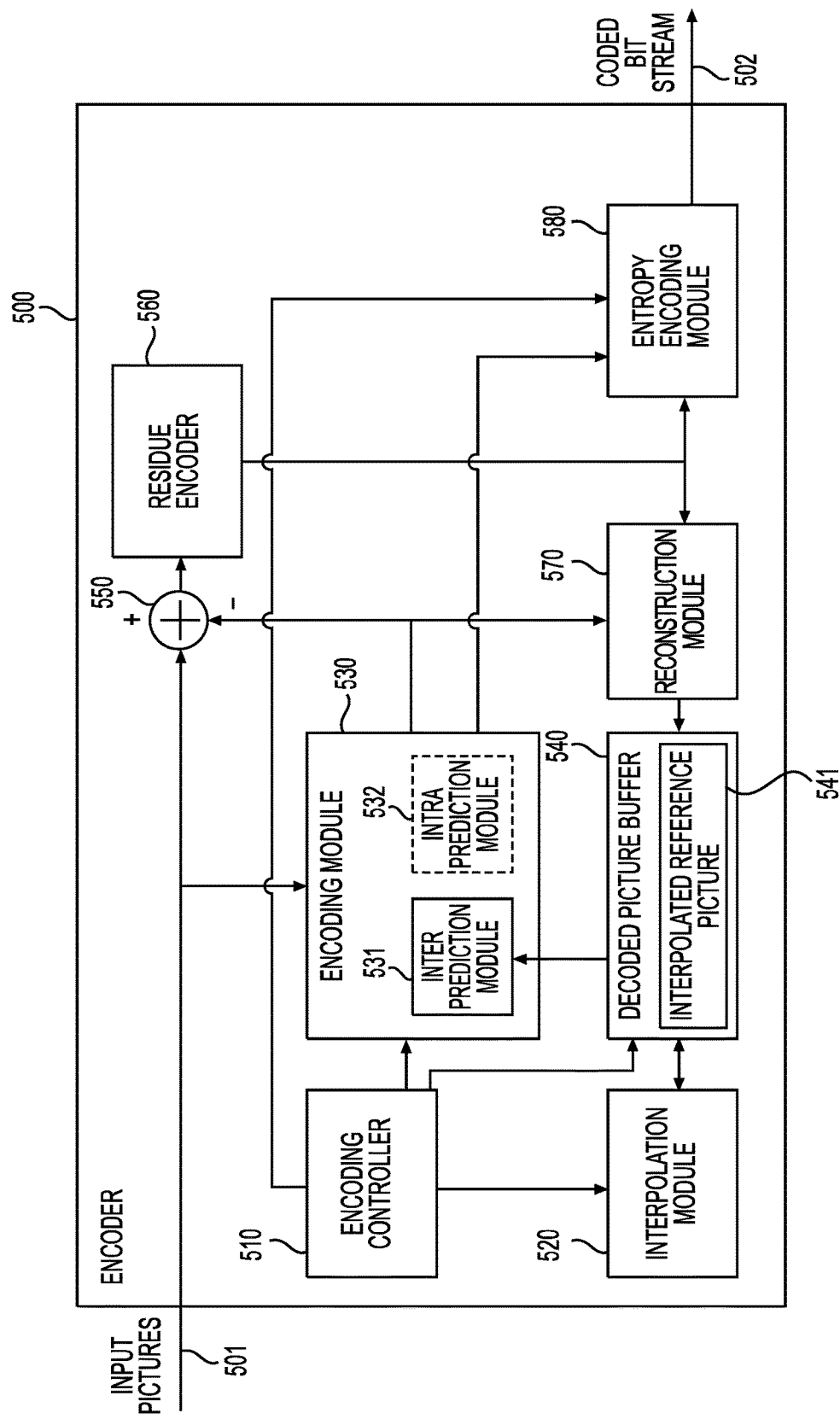
FIG. 5 shows an example encoder according to an embodiment of the disclosure.

FIG. 5 shows an example encoder 500 according to an embodiment of the disclosure. The encoder 500 performs functions similar to that of the encoder 110 in FIG. 1 example, and includes components included in the encoder 110 but with more details. The encoder 500 includes an encoding controller 510, an interpolation module 520, a encoding module 530 that includes an inter prediction module 531 and an intra prediction module 532, an decoded picture buffer 540 that can store IRPs, an adder 550, a residue encoder 560, a reconstruction module 570, and an entropy encoding module 580. Those components are coupled together as shown in FIG. 5.

The encoder 500 receives a sequence of input pictures 501 and encodes the sequence of input pictures to generate a coded bit stream 502. Particularly, the encoder 500 performs inter picture coding using one or more interpolated pictures as reference pictures. The encoding controller 510, the interpolation module 520, the encoding module 530, the inter prediction module 531, the intra prediction module 532, the decoded picture buffer 540 storing IRPs in the encoder 500 have similar structures or functions as the encoding controller 111, the interpolation module 112, the encoding module 113, the inter prediction module 114, the intra prediction module 115, the decoded picture buffer 116 storing IRPs, respectively. Descriptions of those components in FIG. 5 are omitted.

The adder 550 receives blocks of input pictures 501 and predictions of respective blocks generated from the encoding module 530. In one example, the adder 550 subsequently subtracts a prediction of a block from the block to generate a residual portion of the block. In one example, the adder 550 performs the subtraction operation on each of the blocks of the input pictures 501. The residual portions are then passed to the residue encoder 560.

In one example, the residue encoder 560 compresses the residual portions of the input pictures 501 to generate compressed residual portions. For example, the residue encoder 560 may first apply a transform, such as a discrete cosine transform (DCT), wavelet transform, and the like, to a residual portion of a block and generate transform coefficients of the block. Subsequently, the residue encoder 560 can quantize the coefficients to compress the residual portion. The compressed residual portions are transmitted to the reconstruction module 570 and the entropy encoding module 580.

In one example, the reconstruction module 570 receives a prediction of a block from the encoding module 530 and a corresponding compressed portion of the block from the residue encoder 560. Then, the reconstruction module 570 performs an inverse process of the quantization and transformation operations performed at the residue encoder 560 to reconstruct a residual portion. Due to the quantization operation, the reconstructed residual portion is similar to the original residual portion generated from the adder 550 but typically is not the same as the original version. Thereafter, the reconstruction module 570 combines the reconstructed residual portion with the received prediction portion to reconstruct a decoded picture. The decoded picture can then be stored in the decoded picture buffer 540. In some examples, the decoded picture is processed by an in-loop filter before storing into the decoded picture buffer 540. The in-loop filter can be one or a combination of a deblocking filter, a sample adaptive offset filter, and an adaptive loop filer. However, the present application is not limited thereto.

In one example, the entropy encoding module 580 receives compressed residual portions (such as quantized coefficients) from the residue encoder 560, prediction parameters and intra mode information from the encoding module 530, and syntax elements related with usage of IRPs generated from the encoding controller 510. The entropy encoding module 580 processes those received information to further reduce bit numbers for representing those information. For example, predictive coding, variable length coding, arithmetic coding, and the like can be performed to further compressing the received information. Thereafter, those received information in their compressed forms are assembled into the coded bit stream 502 according to certain syntax, such as syntax specified by a video coding standard. In various examples, the coded bit stream 502 can be transmitted over a network to a decoding device, or can be transmitted to a storage device and stored in the storage device.

Figure 6:
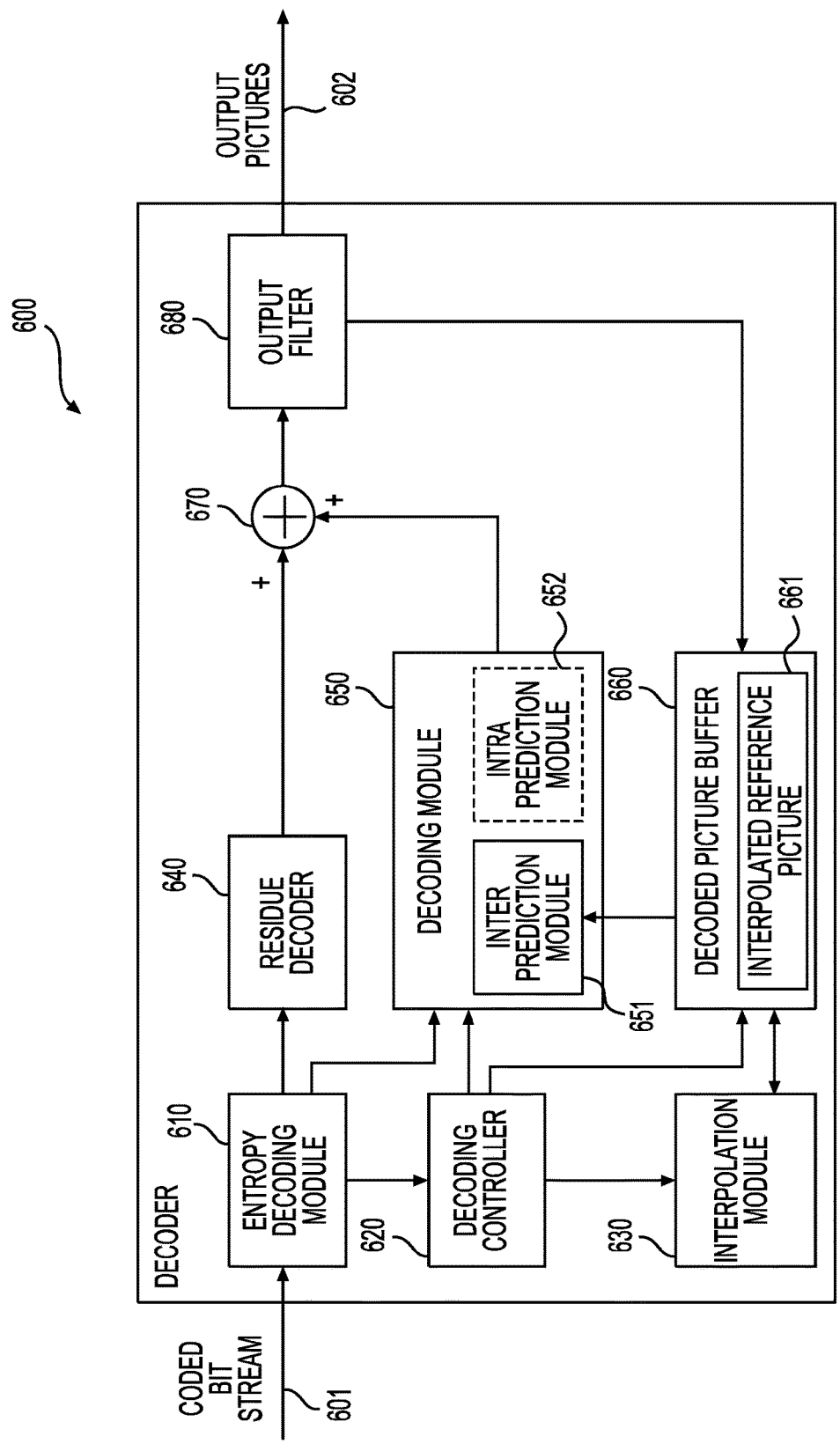
FIG. 6 shows an example decoder according to an embodiment of the disclosure.

FIG. 6 shows an example decoder 600 according to an embodiment of the disclosure. The decoder 600 performs functions similar to that of the decoder 120 in FIG. 1 example, and includes components included in the decoder 120 but with more details. The decoder 600 includes an entropy decoding module 610, a decoding controller 620, an interpolation module 630, a residue decoder 640, a decoding module 650 that includes an inter prediction module 651 and an intra prediction module 652, a DPB 660 that can store IRPs 661, an adder 670, and an output filter 680. Those components are coupled together as shown in FIG. 6.

The coder 600 receives a coded bit stream 601 generated by an encoder, such as the encoder 500, and performs a decoding process to generate output pictures 602. Particularly, the decoder 600 decodes compressed video data carried in the coded bit stream 601 using one or more interpolated pictures as reference pictures. The coded bit stream can be received from an encoding device over a network, or can be retrieved from a storage device, such as a CD-ROM, a magnetic disk, a flash memory, and the like.

The decoding controller 620, the interpolation module 630, the decoding module 650, the inter prediction module 651, the intra prediction module 652, and the DPB 660 have similar structures or functions as the decoding controller 121, the interpolation module 122, the decoding module 123, the inter prediction module 124, the intra prediction module 125, and the DPB 126, respectively. Descriptions of those components in FIG. 6 are omitted.

In one example, the entropy decoding module 610 performs an inverse process of operations performed by the entropy encoding module 580 in FIG. 5 example. For example, compressed residual portions of blocks, prediction parameters or intra mode information, and syntax elements related with usage of IRPs can be obtained by inverse processes, such as an inverse process of variable length coding, an inverse process of predictive coding process, and an inverse of arithmetic coding. Subsequently, compressed residual portions of blocks, prediction parameters or intra mode information, and syntax elements related with usage of IRPs can be provided to the residue decoder 640, the decoding module 650, and the decoding controller 620, respectively.

In one example, the residue decoder 640 receives the compressed residual portions of blocks and performs an inverse process of quantization and transformation process to obtain residual portions of blocks. The residual portions are provided to the adder 670. In one example, the adder 670 receives the residual portions of blocks from the residue decoder 640 and predictions of blocks from the decoding module 650, and combines a residual portion of a block and a respective prediction of the block to generate a reconstructed block.

In one example, the output filter 680 receives reconstructed blocks from the adder 680, and performs a deblocking process to smooths boundary areas between different blocks in a picture. Accordingly, filtered pictures are generated as output pictures 602. In addition, the filtered pictures are stored into the DPB 660 to be used as reference pictures. In some examples, the output filter 680 may correspond to one or a combination of a deblocking filter, a sample adaptive offset filter, and an adaptive loop filer. However, the present application is not limited thereto. In one example, the filter pictures are stored in the DPB 660 before being output. Accordingly, the decoding controller 620 may manage the DPB 660, for example, marking pictures in the DPB 660 as reference pictures or non-reference pictures and removing non-reference pictures after being output.

In various examples, the encoder 500 and the decoder 600 may be implemented by one or more video coding devices that can include the decoder 500, the encoder 600, or both the encoder 500 or the decoder 600. The components of the encoder 500 or decoder 600 can be implemented with suitable software or hardware, or combination thereof. For example, the components of the encoder or decoder 600 can be implemented using various integrated circuits (IC), such as application specific IC (ASIC), field programmable gate array (FPGA), and the like, and can be implemented in one IC or multiple ICs. The components of the encoder or decoder 600 can be implemented as computer programs including instructions. The instructions can be stored in a storage medium, such as RAM, ROM, CD-ROM, magnetic disk storage, flash memory, and the like. The instructions, when executed by a processor or processing circuitry, can cause the processor or the processing circuitry to perform functions of the respective components in the encoder 500 or decoder 600. Accordingly, the encoder 500 or decoder 600 can include suitable storage media, processors, or processing circuitry. The DPB 540 and the DPB 660 can be implemented with any suitable memory, such as DRAM, SRAM, and the like.

Figure 7:
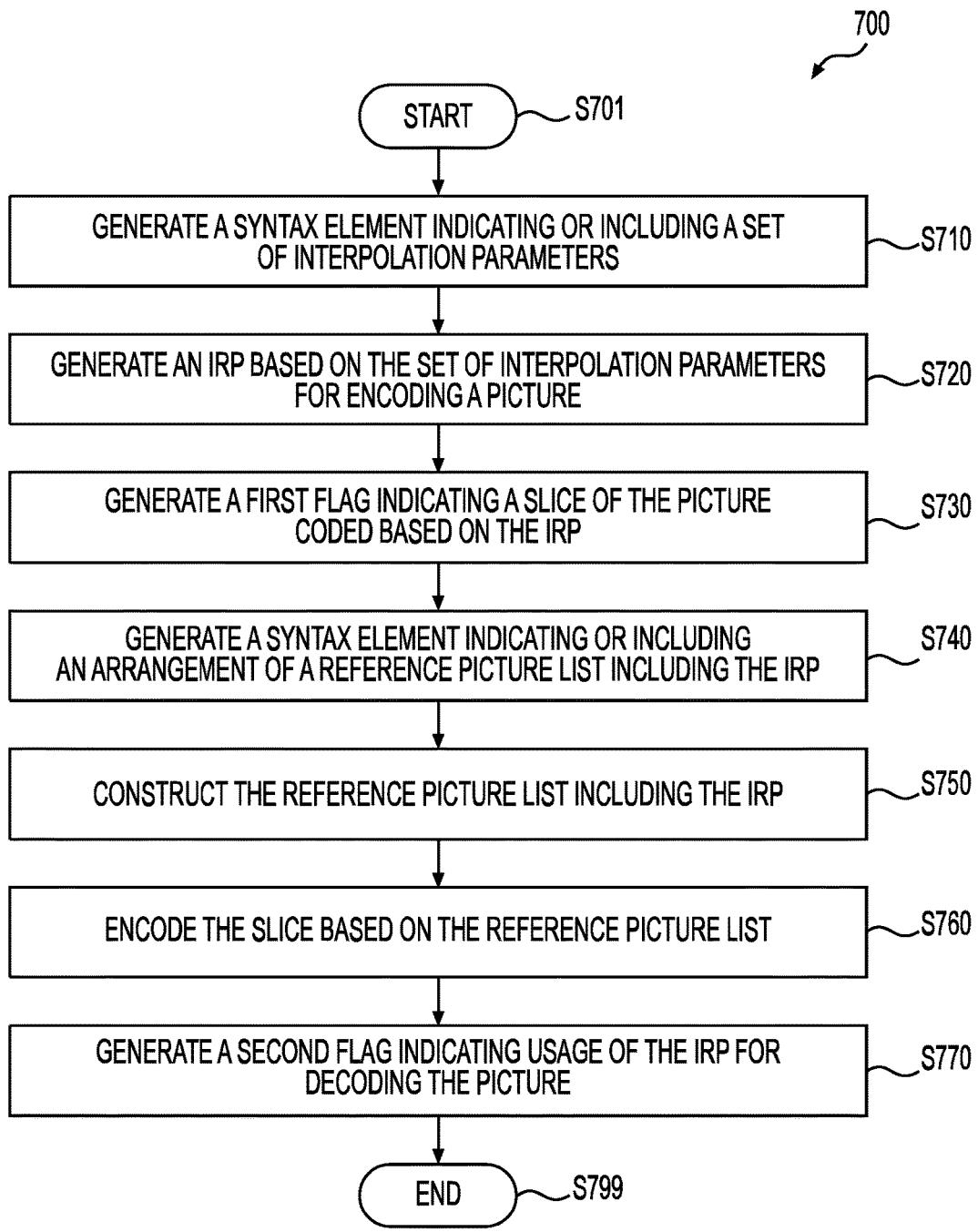
FIG. 7 shows a process for encoding a sequence of pictures using IRPs according to an embodiment of the disclosure.

FIG. 7 shows a process 700 for encoding a sequence of pictures using IRPs according to an embodiment of the disclosure. The process 700 can be performed by the encoder 110 in FIG. 1 example, or the encoder 500 in FIG. 5 example. FIG. 1 example is used to explain the process 700. The process 700 starts at S701 and proceeds to S710.

At S710, a syntax element indicating or including a set of interpolation parameters can be generated at the encoding controller 111. For example, the encoding controller 111 triggers the interpolation module 112 to construct one or more IRPs for encoding a current picture. At the same time, interpolation parameters for generation of the IRPs, such as construction methods, identifiers of reference pictures, distances of the reference pictures from the current picture, are provided to the interpolation module 112. Those provided interpolation parameters are included in or indicated by a syntax element in the coded bit stream 132, and signaled to the decoder 120.

At S720, an IRP for encoding the current picture is generated at the interpolation module 112 based on the set of interpolation parameters indicated by or included in the syntax element generated at S710. The IRP can be stored into the decoded picture buffer 116, and later used as a reference picture.

At S730, a first flag is generated at the encoding controller 111. The flag indicates that a slice of the current picture is coded using the IRP. The first flag can be included in a slice segment header corresponding to the slice.

At S740, a syntax element is generated at the encoding controller 111. The syntax element indicates or includes an arrangement of a reference picture list that includes the IRP. The syntax element can be included in the slice segment header corresponding to the slice or a PPS referenced by the slice.

At S750, the reference picture list including the IRP is constructed by the encoding module 113 according to the arrangement of the reference picture list aforementioned at S740.

At S760, the slice of the current picture is encoded by the inter prediction module 114 based on the reference picture list constructed at S750 and the IRP constructed at S720. For example, blocks in the slice can be coded using inter picture coding, and blocks in the IRP are referenced to generate predictions of respective blocks of the current picture. Reference indexes into the reference picture list including the IRP can be used for indicating referenced reference pictures including the IRP.

At S770, a second flag indicating usage of the IRP for decoding the current picture is generated at the encoding controller 111. The second flag can be included in a PPS associated with the current picture. For example, slices of the current picture may include a slice segment header which references the PPS to learn existence of the flag. The process 700 proceeds to S799 and terminates at S799.

Figure 8:
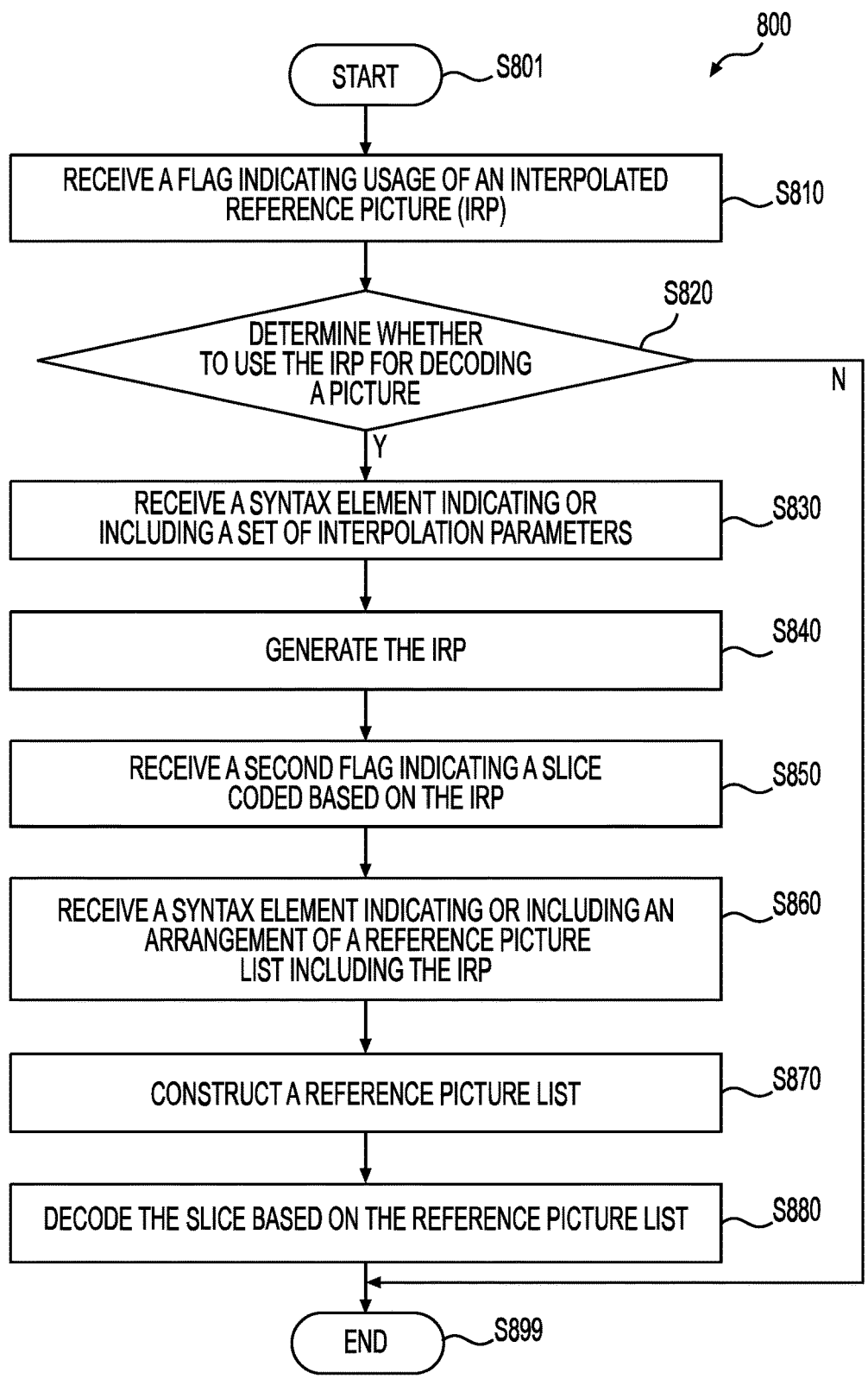
FIG. 8 shows a process for decoding a sequence of pictures that are encoded using IRPs according to an embodiment of the disclosure.

FIG. 8 shows a process 800 for decoding a sequence of pictures that are encoded using IRPs according to an embodiment of the disclosure. The process 800 can be performed at the decoder 120 in FIG. 1 example, or the decoder 600 in FIG. 6 example. FIG. 1 example is used to explain the process 800. The process 800 starts at S801 and proceeds to S810.

At S810, a flag indicting usage of an IRP is received at the decoding controller 121. The flag can be included in a PPS associated with a current picture of a sequence of pictures, thus indicating the current picture is coded using the IRP. The PPS can be included in a coded bit stream received at the decoder 120.

At S820, whether to use the IRP for decoding the current picture is determined at the decoding controller 121. For example, the decoding controller 121 can check whether the DPB 126 has picture buffers available for storing the IPR and respective reference pictures used for generation of the IRP. When intra block copy is to be employed for decoding the current picture, the determination also considers whether a decoded picture buffer in the decoded picture buffer 116 is available for storing a version of the current picture. Additionally, the decoding controller 121 can check whether reference pictures used for generation of IRP are available in the DPB 126. When the decoded picture buffers in the decoded picture buffer 116 are available for storing the IRP, the reference pictures for generation of the IRP, and a version of the current picture (when intra bock copy is employed), the decoding controller 121 continues the process for decoding the current picture, and proceeds to S830. Otherwise, the process 800 proceeds to S899, and decoding operation of the current picture terminates at S899.

At S830, a syntax element indicating or including a set of interpolation parameters for generation of the IRP is received at the encoding controller 111. For example, a PPS associated with the current picture can be received. The PPS can include the set of interpolation parameters. Alternatively, a syntax element, for example, in a PPS, indicating the set of interpolation parameters is received. The interpolation parameters can be thus obtained and provided to the interpolation module 122. In other examples, no syntax element including or indicating a set of interpolation parameters is received. Accordingly, a default set of interpolation parameters can be used.

At S840, the IRP for decoding the current picture is generated at the interpolation module 122 based on the interpolation parameters described at S830. The IRP can then be stored in the DPB 126.

At S850, a second flag is received at the decoding module 123. The second flag indicates a slice of the current picture is coded using the IRP. The second flag can be included in a slice header of the slice, or can be included in PPS referenced by the slice.

At S860, a syntax element indicating or including an arrangement of a reference picture list including the IRP is received at the decoding module 123. The syntax element can be included in a slice segment header of the slice, or can be a PPS referenced by the slice. Thus, the arrangement can be obtained and used for reconstruction the reference picture list. Alternatively, in other examples, no syntax element indicating or including an arrangement of a reference picture list is received. Accordingly, a default arrangement can be used.

At S870, the reference picture list can be constructed by the decoding module 123 based on the arrangement of the reference picture list described at S860.

At 880, the slice is decoded based on the constructed reference picture list including the IRP, and the IRP constructed at S840. For example, the inter prediction module 124 may receive prediction parameters of a block in the slice that references the IRP for inter picture coding. The prediction parameters can include reference indexes into the reference picture list referring the IRP. Based on the reference indexes, an IRP can thus be determined. Subsequently, a prediction of the block can be obtained based on other prediction parameters, such as motion vectors. The process 800 proceeds to S899 and terminates at S899.

Figure 9:
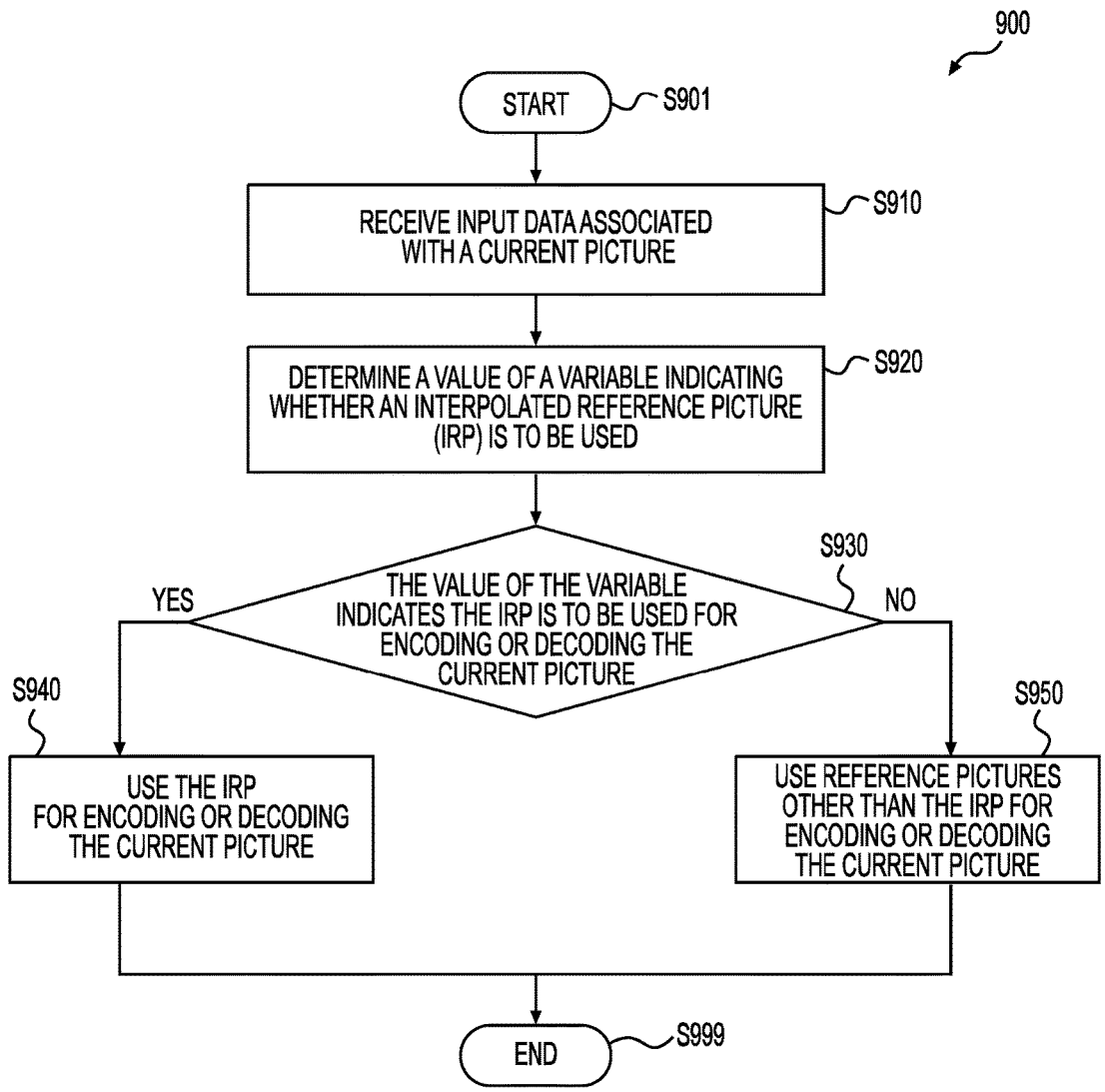
FIG. 9 shows a process for coding a picture according to an embodiment of the disclosure.

FIG. 9 shows a process 900 for coding a picture according to an embodiment of the disclosure. The process 900 can be performed at an encoder (e.g., encoder 110 in FIG. 1 example or the encoder 500 in FIG. 5 example), or at a decoder (e.g., decoder 120 in FIG. 1 example or the decoder 600 in FIG. 6 example). The process 900 starts at S901 and proceeds to S910.

At S910 input data associated with a current picture is received. At the encoder side, the input data may correspond to a sequence of input pictures including the current picture. At the decoder side, the input data may correspond to a coded bit stream associated with the current picture.

At S920, a value of a variable indicating whether an interpolated reference picture (IRP) is used for encoding or decoding the current picture is determined according to a size of a decoded picture buffer (DPB) and reference pictures stored in the DPB. In some examples, the value is associated with one or more of: a number of reference pictures stored in the DPB, whether the DPB is full, an existence of two different reference pictures in the DPB, a high-level syntax element enabling or disabling the use of an IRP, and whether intra block copy (IBC) is used. The value of the variable can be explicitly signaled by the encoder to the decoder, or can be implicitly derived by the decoder by using the same determination criteria as used by the encoder.

At S930, whether to use the IRP for encoding or decoding the current picture is determined based on the value of the variable.

At S940, when the value of the variable indicates the current picture is to be encoded or decoded by using the IRP, the IRP generated based on reference pictures stored in the DPB is used for encoding or decoding the current picture. The process 900 proceeds to S999, and terminates at S999.

At S950, when the value of the variable indicates the current picture is not to be encoded or decoded by using the IRP, one or more reference pictures other than the IRP is used for encoding or decoding the current picture. The process 900 proceeds to S999, and terminates at S999.

While for purposes of simplicity of explanation, the processes 700, 800 and 900 are shown and described as a series of steps, it is to be understood that, in various embodiments, the steps may occur in different orders and/or concurrently with other steps from what is described above.

Moreover, not all illustrated steps may be required to implement the process described above.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for encoding a sequence of pictures into a coded bit stream, comprising:
   a decoded picture buffer (DPB) configured to store reference pictures, at least one of the reference pictures being an interpolated reference picture (IRP);
   an interpolation circuit configured to generate the IRP based on two of the other reference pictures stored in the DPB, wherein a pixel value of the IRP is a weighted average of pixel values of two pixels in each of the two of the other reference pictures;
   an encoding controller configured to determine whether to encode a current picture in the sequence of pictures using the IRP; and
   an encoding circuit configured to
      determine an arrangement of a reference picture list that includes the IRP for encoding the current picture, wherein the arrangement of the reference picture list includes arranging the IRP in a last position of a reference picture list when no current reference picture is used as a reference picture for encoding the current picture, a default position of a reference picture list, a specific position of a reference picture list specified in a high-level syntax element, or a position between short-term and long-term reference pictures in a reference picture list, and
      encode the current picture in the sequence of pictures using the IRP when it is determined to encode the current picture in the sequence of pictures using the IRP.

2. The apparatus of claim 1, wherein the encoding controller is further configured to:
   determine a set of interpolation parameters for generation of the IRP.

3. The apparatus of claim 1, wherein the interpolation circuit is further configured to perform at least one of the following operations to generate the IRP:
   calculating a weighted picture average based on a past reference picture and a future reference picture with respect to the current picture,
   calculating a weighted picture average of two past reference pictures or two future reference pictures with respect to the current picture,
   performing a motion compensated interpolation of a past reference picture and a future reference picture with respect to the current picture, or
   performing a motion compensated interpolation of two past reference pictures or two future pictures with respect to the current picture.

4. The apparatus of claim 1, wherein a current reference picture is used as a reference picture for encoding the current picture, and is included in the reference picture list, and wherein the arrangement of the reference picture list includes arranging the IRP in one of:
   a second to last position while the current reference picture is in a last position of the reference picture list;
   the last position while the current reference picture is in the second to last position of the reference picture list;
   a position between short-term and long-term reference pictures and before the current reference picture which is arranged between the short-term and long-term reference pictures; or
   a position between short-term and long-term reference pictures and after the current reference picture which is arranged between the short-term and long-term reference pictures.

5. The apparatus of claim 1, wherein the encoding controller is further configured to generate a syntax element associated with a set of interpolation parameters for generation of the IRP to be incorporated in the coded bit stream, and/or generate a syntax element associated with an arrangement of a reference picture list that includes the IRP for encoding the current picture to be incorporated in the coded bit stream.

6. The apparatus of claim 1, wherein the encoding controller is configured to determine whether to encode the current picture in the sequence of pictures using the IRP according to one or more of:
   a size of the DPB, a high-level syntax element enabling or disabling the use of an IRP, an existence of two different reference pictures in the DPB, and whether intra block copy (IBC) is used.

7. The apparatus of claim 1, wherein the encoding controller is further configured to generate a syntax element to be incorporated in the coded bit stream indicating whether the current picture in the sequence of pictures is encoded using the IRP.

8. The apparatus of claim 1, wherein a buffer space is allocated for storing the IRP before the encoding circuit encodes the current picture, and the IRP is removed from the DPB after the encoding circuit encodes the current picture by using the IRP.

9. The apparatus of claim 1, wherein a buffer space is allocated for storing the IRP before the encoding circuit encodes the current picture, and the IRP is remained in the DPB for a future picture after the encoding circuit encodes the current picture by using the IRP.

10. An apparatus for decoding a sequence of pictures from a coded bit stream, comprising:
   a decoded picture buffer (DPB) configured to store reference pictures, at least one of the reference pictures being an interpolated reference picture (IRP);
   an interpolation circuit configured to generate the IRP based on two of the other reference pictures stored in the DPB, wherein a pixel value of the IRP is a weighted average of pixel values of two pixels in each of the two of the other reference pictures;
   a decoding controller configured to determine whether to decode a current picture in the sequence of pictures using the IRP; and
   a decoding circuit configured to
      determine an arrangement of a reference picture list that includes the IRP for encoding the current picture, wherein the arrangement of the reference picture list includes arranging the IRP in a last position of a reference picture list when no current reference picture is used as a reference picture for encoding the current picture, a default position of a reference picture list, a specific position of a reference picture list specified in a high-level syntax element, or a position between short-term and long-term reference pictures in a reference picture list, and decode the current picture in the sequence of pictures using the IRP when it is determined to decode the current picture in the sequence of pictures using the IRP.

11. The apparatus of claim 10, wherein the decoding controller is further configured to:
determine a set of interpolation parameters for generation of the IRP.

12. The apparatus of claim 10, wherein the interpolation circuit is further configured to perform at least one of the following operations to generate the IRP:
calculating a weighted picture average based on a past reference picture and a future reference picture with respect to the current picture,
calculating a weighted picture average of two past reference pictures or two future reference pictures with respect to the current picture,
performing a motion compensated interpolation of a past reference picture and a future reference picture with respect to the current picture, or
performing a motion compensated interpolation of two past reference pictures or two future pictures with respect to the current picture.

13. The apparatus of claim 10, wherein a current reference picture is used as a reference picture for decoding the current picture, and is included in the reference picture list, and wherein the arrangement of the reference picture list includes arranging the IRP in one of:
a second to last position while the current reference picture is in a last position of the reference picture list;
the last position while the current reference picture is in the second to last position of the reference picture list;
a position between short-term and long-term reference pictures and before the current reference picture which is arranged between the short-term and long-term reference pictures; or
a position between short-term and long-term reference pictures and after the current reference picture which is arranged between the short-term and long-term reference pictures.

14. The apparatus of claim 10, wherein the decoding controller is further configured to receive a syntax element associated with a set of interpolation parameters for generation of the IRP in the coded bit stream, and/or receive a syntax element associated with an arrangement of a reference picture list that includes the IRP for decoding the current picture in the coded bit stream.

15. The apparatus of claim 10, wherein the decoding controller is configured to determine whether to decode the current picture in the sequence of pictures using the IRP according to one or more of: a size of the DPB, an existence of two different reference pictures in the DPB, a high-level syntax element enabling or disabling the use of the IRP, and whether intra block copy (IBC) is used.

16. The apparatus of claim 10, wherein the decoding controller is further configured to receive a syntax element in the coded bit stream indicating whether the current picture in the sequence of picture is encoded using the IRP.

17. The apparatus of claim 10, wherein a buffer space is allocated for storing the IRP before the decoding circuit decodes the current picture, and the IRP is removed from the DPB after the decoding circuit decodes the current picture using the IRP.

18. The apparatus of claim 10, wherein a buffer space is allocated for storing the IRP before the decoding circuit decodes the current picture, and the IRP is remained in the DPB for a future picture after the decoding circuit decodes the current picture by using the IRP.

19. A method for encoding a sequence of pictures into a coded bit stream, comprising:
determining whether to encode a current picture in the sequence of pictures using an interpolated reference picture (IRP);
generating the IRP based on two reference pictures stored in a decoded picture buffer (DPB), wherein a pixel value of the IRP is a weighted average of pixel values of two pixels in each of the two reference pictures;
storing the IRP in the DPB;
constructing a reference picture list by arranging the IRP in a last position of the reference picture list when no current reference picture is used as a reference picture for encoding the current picture, a position between short-term and long-term reference pictures in the reference picture list, a default position of the reference picture list, or a specific position of the reference picture list specified in a high-level syntax element; and
when it is determined that the current picture in the sequence of pictures is to be encoded using the IRP, encoding the current picture by using the IRP.

20. The method of claim 19, wherein a current reference picture is used as a reference picture for encoding the current picture and is included in the reference picture list, and constructing the reference picture list includes arranging the IRP in one of:
a second to last position while the current reference picture is in a last position of the reference picture list;
the last position while the current reference picture is in the second to last position of the reference picture list;
a position between short-term and long-term reference pictures and before the current reference picture which is arranged between the short-term and long-term reference pictures; or
a position between short-term and long-term reference pictures and after the current reference picture which is arranged between the short-term and long-term reference pictures.

21. The method of claim 19, further including:
determining whether to encode the current picture using the IRP according to one or more of: a size of the DPB, a high-level syntax element enabling or disabling the use of the IRP, an existence of two different reference pictures in the DPB, and whether intra block copy (IBC) is used.

22. The method of claim 19, further comprising:
generating a syntax element to be incorporated in the coded bit stream indicating whether the current picture in the sequence of pictures is encoded using the IRP.

23. The method of claim 19, further comprising:
allocating a buffer space for storing the IRP before encoding the current picture; and
removing the IRP from the DPB after encoding the current picture using the IRP.

24. The method of claim 19, further comprising:
allocating a buffer space for storing the IRP before encoding the current picture; and
retaining the IRP in the DPB for a future picture after encoding the current picture using the IRP.

25. A method for decoding a sequence of pictures from a coded bit stream, comprising:
determining whether to decode a current picture in the sequence of pictures using an interpolated reference picture (IRP);

generating the IRP based on two reference pictures stored in a decoded picture buffer (DPB), wherein a pixel value of the IRP is a weighted average of pixel values of two pixels in each of the two reference pictures;

storing the IRP in the DPB;

constructing a reference picture list by arranging the IRP in a last position of the reference picture list when no current reference picture is used as a reference picture for encoding the current picture, a position between short-term and long-term reference pictures in the reference picture list, a default position of the reference picture list, or a specific position of the reference picture list specified in a high-level syntax element; and when it is determined that the current picture in the sequence of pictures is to be decoded using the IRP, decoding the current picture by using the IRP.

26. The method of claim 25, wherein a current reference picture is used as a reference picture for decoding the current picture and is included in the reference picture list, and constructing the reference picture list includes arranging the IRP in one of:

a second to last position while the current reference picture is in a last position of the reference picture list;

the last position while the current reference picture is in the second to last position of the reference picture list;

a position between short-term and long-term reference pictures and before the current reference picture which is arranged between the short-term and long-term reference pictures; or a position between short-term and long-term reference pictures and after the current reference picture which is arranged between the short-term and long-term reference pictures.

27. The method of claim 25, further comprising:

determining whether to decode the current picture in the sequence of pictures using the IRP according to one or more of: a size of the DPB, an existence of two different reference pictures in the DPB, a high-level syntax element enabling or disabling the use of an IRP, and whether intra block copy (IBC) is used.

28. The method of claim 25, further comprising:

receiving a syntax element associated in the coded bit stream indicating whether the current picture in the sequence of pictures is encoded using the IRP.

29. The method of claim 25, further comprising:

allocating a buffer space for storing the IRP before decoding the current picture; and removing the IRP from the DPB after decoding the current picture using the IRP.

30. The method of claim 25, further comprising:

allocating a buffer space for storing the IRP before decoding the current picture; and retaining the IRP in the DPB for a future picture after decoding the current picture using the IRP.

* * * * *